(12) United States Patent
Olgaard et al.

(10) Patent No.: US 7,706,250 B2
(45) Date of Patent: Apr. 27, 2010

(54) APPARATUS AND METHOD FOR SIMULTANEOUS TESTING OF MULTIPLE ORTHOGONAL FREQUENCY DIVISION MULTIPLEXED TRANSMITTERS WITH SINGLE VECTOR SIGNAL ANALYZER

(75) Inventors: Christian Volf Olgaard, Sunnyvale, CA (US); Stephen James Bennett, San Francisco, CA (US); Vakis Papaparaskeva, Sunnyvale, CA (US); Dirk Walvis, Santa Cruz, CA (US)

(73) Assignee: LitePoint Corp., Sunnyvale, CA (US)

( * ) Notice: Subject to any disclaimer, the term of this patent is extended or adjusted under 35 U.S.C. 154(b) by 753 days.

(21) Appl. No.: 11/533,987

(22) Filed: Sep. 21, 2006

(65) Prior Publication Data

US 2007/0070881 A1    Mar. 29, 2007

Related U.S. Application Data

(60) Provisional application No. 60/596,444, filed on Sep. 23, 2005.

(51) Int. Cl.
    *H04J 11/00*    (2006.01)
(52) U.S. Cl. .................... 370/208; 375/260
(58) Field of Classification Search ............... 370/203, 370/208–210, 241, 242, 252; 375/260
    See application file for complete search history.

(56) References Cited

U.S. PATENT DOCUMENTS

| | | |
|---|---|---|
| 6,628,923 B1 | 9/2003 | Eriksson |
| 7,061,219 B2 | 6/2006 | Yoshihara et al. |
| 7,123,889 B2 | 10/2006 | Scheck et al. |
| 7,142,609 B2 | 11/2006 | Terreault et al. |
| 7,180,937 B2 | 2/2007 | Matreci et al. |
| 7,336,742 B2 | 2/2008 | Ohseki et al. |
| 7,484,146 B2 | 1/2009 | Olgaard et al. |
| 7,492,700 B2 | 2/2009 | Schmidt |
| 2002/0136157 A1 | 9/2002 | Takaoka |
| 2003/0053532 A1 | 3/2003 | Cutler et al. |
| 2004/0125742 A1 | 7/2004 | Schmidt |
| 2004/0240379 A1* | 12/2004 | Tsuie .................... 370/210 |
| 2005/0052990 A1 | 3/2005 | Lomnitz |
| 2005/0130610 A1 | 6/2005 | Scheck et al. |
| 2005/0136844 A1 | 6/2005 | Giesberts et al. |
| 2005/0176376 A1 | 8/2005 | Liu |
| 2005/0186986 A1 | 8/2005 | Hansen et al. |
| 2005/0249129 A1 | 11/2005 | Goodall et al. |
| 2005/0265298 A1 | 12/2005 | Adachi et al. |
| 2006/0045199 A1 | 3/2006 | Kim |
| 2006/0099916 A1 | 5/2006 | Arkiszewski et al. |
| 2006/0176967 A1 | 8/2006 | Stanton et al. |
| 2006/0223466 A1 | 10/2006 | Behzad |

(Continued)

OTHER PUBLICATIONS

International Search Report for PCT/US06/37054, dated Oct. 26, 2007, 3 pages.

(Continued)

*Primary Examiner*—Ricky Ngo
*Assistant Examiner*—Kan Yuen
(74) *Attorney, Agent, or Firm*—Vedder Price P.C.

(57) ABSTRACT

A signal analyzer and method for measuring signal compression levels of one or more individual orthogonal frequency division multiplexed (OFDM) signals among a plurality of OFDM signals within a composite signal.

10 Claims, 19 Drawing Sheets

U.S. PATENT DOCUMENTS

| | | |
|---|---|---|
| 2006/0262868 A1 | 11/2006 | Leshem |
| 2007/0036208 A1 | 2/2007 | Olgaard |
| 2007/0070691 A1 | 3/2007 | Walvis et al. |
| 2007/0070881 A1 | 3/2007 | Olgaard et al. |
| 2007/0086349 A1 | 4/2007 | Liu |
| 2007/0280196 A1 | 12/2007 | Olgaard et al. |
| 2007/0294378 A1 | 12/2007 | Olgaard et al. |
| 2007/0297537 A1 | 12/2007 | Luce |
| 2008/0054880 A1 | 3/2008 | Miyauchi et al. |
| 2008/0084951 A1 | 4/2008 | Chen et al. |
| 2008/0144707 A1 | 6/2008 | Tsafati et al. |
| 2008/0172588 A1 | 7/2008 | Olgaard |
| 2008/0285672 A1 | 11/2008 | Akita |
| 2008/0298449 A1 | 12/2008 | Yokoyama et al. |
| 2009/0003385 A1 | 1/2009 | Wu |
| 2009/0037163 A1 | 2/2009 | Kong et al. |
| 2009/0052578 A1 | 2/2009 | Sawai |
| 2009/0061782 A1 | 3/2009 | Olgaard |
| 2009/0092053 A1 | 4/2009 | Olgaard |

OTHER PUBLICATIONS

Written Opinion for PCT/US06/37054, dated Oct. 26, 2007, 4 pages.

Webster, Anthony P., et al., "Measurement-based Modeling of a 5 GHz WLAN Transmitter", Google Scholar on line, http://ee.eng.usf.edu, Sep. 19, 2004, 4 pages.

Olgaard, Christian, "Combining CCDF and EVM Assess 802.11 Transmitters", Google Scholar, www.litepoint.com, Sep. 1, 2004, 1 page.

Olgaard, Christian, "Using Advanced Signal Analysis to Identify Sources of WLAN ransmitter Degradations", RFDESIGN, http://rfdesign.com/mag/410rfdf2a, Oct. 1, 2004, 5 pages.

U.S. Appl. No. 11/533,971, filed Sep. 21, 2006.

International Search Report corresponding to International Patent Application No. PCT/US2006/036995, dated Aug. 6, 2007, 5 pages.

Written Opinion corresponding to International Patent Application No. PCT/US2006/036995, dated Aug. 6, 2007, 5 pages.

Non-Final Office Action dated May 26, 2009 in Patent Application No. 11/533,971, 14 pages.

Final Office Action dated Oct. 21, 2009 in Patent Application No. 11/533,971, 9 pages.

* cited by examiner

APPARATUS AND METHOD FOR SIMULTANEOUS TESTING OF MULTIPLE ORTHOGONAL FREQUENCY DIVISION MULTIPLEXED TRANSMITTERS WITH SINGLE VECTOR SIGNAL ANALYZER

RELATED APPLICATION

This application claims priority from U.S. Provisional Patent Application 60/596,444, filed Sep. 23, 2005.

BACKGROUND

1. Field of the Invention

The present invention relates to testing of orthogonal frequency division multiplexing (OFDM) transmitters, and in particular, to testing of OFDM transmitters using a vector signal analyzer (VSA).

2. Related Art

As is well known, multiple input, multiple output (MIMO) communication systems use multiple transmitters and receivers to enhance the reliability and signal capacity of the communication link. Testing of each transmitter is usually done by connecting each individual transmitter to a VSA, and repeating measurements for each transmitter sequentially. Alternatively, another method involves connecting each transmitter to its own VSA and performing the tests simultaneously. Accordingly, the first method only requires one VSA, but significantly more time, while the second method requires multiple VSA systems, but significantly less time.

Traditionally testing of wireless devices has involved testing one active transmitter at a time. Even if the device has offered multiple transmitters, they have typically not been operated in parallel. However, people are constantly trying to increase the data rate. In the past this has been achieved by using more complex modulation and higher bandwidth. These methods have used a single transmitter so measurements could be performed with a single input test instrument.

With the introduction of MIMO technology, multiple parallel transmitters are used to increase the allowable data rate in a given bandwidth by having the individual transmitters carry separate information using the same frequency and bandwidth for transmission. During normal operation, system requires multi-path for reliably transmitting the parallel data streams over the same bandwidth simultaneously. The system relies on advanced signal processing to separate the different transmit signals in the required multiple receivers. The receivers separate and extract the data transmitted by the multiple transmitters. Accordingly, multiple parallel receivers are needed to fully analyze a true MIMO signal, and one can no longer use a single input test instrument to fully analyze the transmitted signal.

This is particularly true for research and development (R&D) testing, where one needs to get as much information as possible about the device under test (DUT). However, for production testing, one may not need as much information, as one is really testing to determine if the DUT is correctly assembled and if all components are fully functional. It is assumed that all major components (e.g., chips) have already been tested, and that the design being produced is verified to work correctly if the assembly is complete and correct, thereby obviating a need for as detailed of a test setup.

From a production perspective, one is looking to have the lowest possible test cost that satisfies full coverage of the required tests. Production testing usually includes both product verification, and often more importantly product calibration. During the product calibration, the performance of the device is adjusted to meet the desired performance.

Optimizing costs of testing in production includes ensuring the fastest possible test time with reasonably priced test equipment. Testing MIMO transmitters would indicate that one could utilize parallel test equipment, such that each transmitter is tested in parallel. This will add little to the test time compared to a traditional device, but will double the cost of the test setup, thus increasing the overall test cost.

Since modern test equipment offers significantly more signal processing capability, options other than simply performing all tests in parallel do exist. As noted, it may not be necessary to measure all parameters of a DUT in production; often one can simply measure the parameters that are expected to change in production devices. This includes identifying failing components and assembly problems, as well as the ability to calibrate the individual transmitters' performance to be close to optimal.

SUMMARY

In accordance with the presently claimed invention, a signal analyzer and method are provided for measuring signal compression levels of one or more individual orthogonal frequency division multiplexed (OFDM) signals among a plurality of OFDM signals within a composite signal.

In accordance with one embodiment of the presently claimed invention, a signal analyzer for measuring signal compression levels of one or more individual orthogonal frequency division multiplexed (OFDM) signals among a plurality of OFDM signals within a composite signal includes:

first signal detector means for detecting a composite data signal, received via a signal communication path and containing at least first and second OFDM signals, to provide a first detected data signal corresponding to an envelope of the composite data signal, wherein the composite data signal originates from a remote signal source having a plurality of signal transmission processes associated therewith and includes a plurality of data packets each of which includes a respective portion of a plurality of transmit data, and each the respective portion of the plurality of transmit data corresponds to a respective portion of a plurality of known data in relation to a respective one of the plurality of signal transmission processes and the signal communication path;

signal processing means for processing the composite data signal and the plurality of known data in at least partial accordance with a plurality of processes at least substantially similar to the plurality of signal transmission processes to provide at least first and second reference signals corresponding to at least first and second portions of the plurality of known data, respectively;

second signal detector means for detecting the at least first and second reference signals to provide at least first and second control signals, respectively; and signal analyzer means for analyzing, in response to the at least first and second control signals, the first detected data signal to provide at least first and second analysis signals indicative of at least first and second power characteristics of the at least first and second OFDM signals, respectively.

In accordance with another embodiment of the presently claimed invention, a method for measuring signal compression levels of one or more individual orthogonal frequency division multiplexed (OFDM) signals among a plurality of OFDM signals within a composite signal includes:

detecting a composite data signal, received via a signal communication path and containing at least first and second OFDM signals, to provide a first detected data signal corresponding to an envelope of the composite data signal, wherein the composite data signal originates from a remote signal source having a plurality of signal transmission processes associated therewith and includes a plurality of data packets each of which includes a respective portion of a plurality of transmit data, and each the respective portion of the plurality of transmit data corresponds to a respective portion of a plurality of known data in relation to a respective one of the plurality of signal transmission processes and the signal communication path;

processing the composite data signal and the plurality of known data in at least partial accordance with a plurality of processes at least substantially similar to the plurality of signal transmission processes to provide at least first and second reference signals corresponding to at least first and second portions of the plurality of known data, respectively;

detecting the at least first and second reference signals to provide at least first and second control signals, respectively; and analyzing, in response to the at least first and second control signals, the first detected data signal to provide at least first and second analysis signals indicative of at least first and second power characteristics of the at least first and second OFDM signals, respectively.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators.

A testing method in accordance with the presently claimed invention provides for testing two or more OFDM transmitters simultaneously with a single VSA. Such method takes advantage of the fact that a typical MIMO OFDM transmitter transmits its output signal in bursts with specific information at the beginning of the burst, i.e., during the preamble, that facilitates reliable reception and demodulation of the remaining portion of the signal burst.

Figure 1:
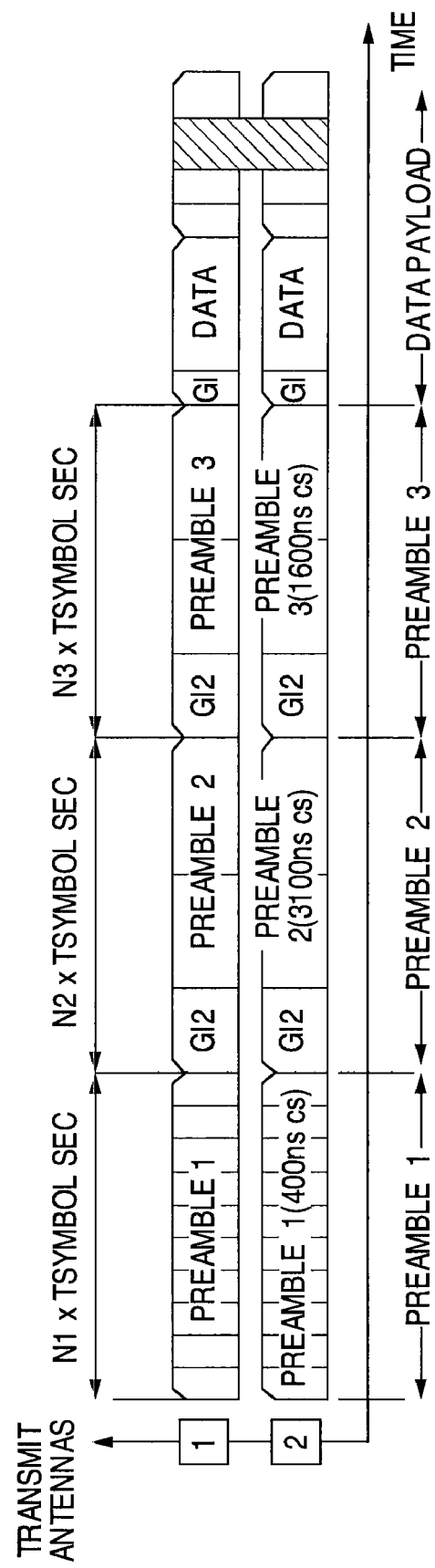
FIG. 1 is a signal diagram depicting typical MIMO OFDM signal burst configurations suitable for use with a method in accordance with one embodiment of the presently claimed invention.

Referring to FIG. 1, one example of a set of signals for use when testing two transmitters in accordance with one embodiment of the presently claimed invention includes two signal bursts, as shown. In this example, three preambles are used, each with its own cyclic shift (CS). The preambles of the second transmitter are identical to the preambles of the first transmitter, except for the cyclic shift. For example, the cyclic shifts of preambles 1, 2 and 3 are 400, 3100 and 1600 nanoseconds, respectively. It will be appreciated, however, that other preambles designed for MIMO operation are also possible.

Figure 2:
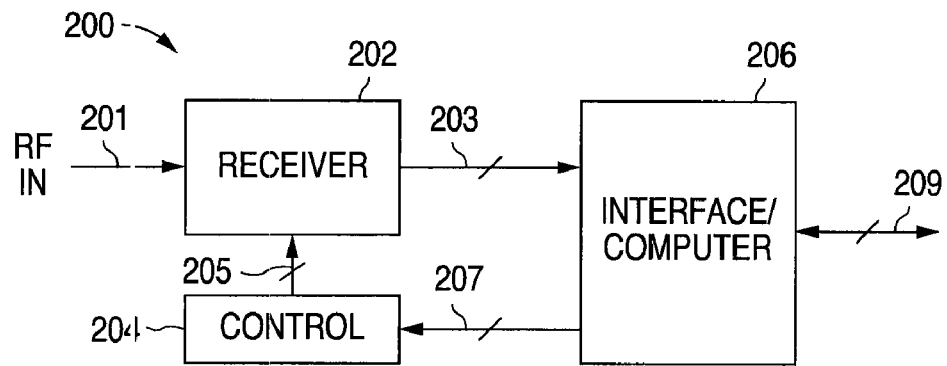
FIG. 2 is a block diagram depicting a receiver system for practicing a method in accordance with one embodiment of the presently claimed invention.

Referring to FIG. 2, one embodiment 200 of a system suitable for practicing the presently claimed invention includes a receiver 202, a controller 204 and an interface 206 which may include a computer. The incoming radio frequency (RF) signal 201 (discussed in more detail below) is processed by the receiver 202 in accordance with control signals 205 from the controller 204. The resulting sampled data vector 203 is provided to the interface 206. If the interface 206 includes a computer, the sampled data vector 203 can be processed locally. Otherwise, the sampled data vector 203 can be relayed, e.g., via a network (such as Ethernet) interface 209, to an external computer for processing. Control data 207 is provided to the controller 204, either by the internal computer of the interface 206 or by an external computer via the interface 206 as received over the network interface 209.

Figure 3:
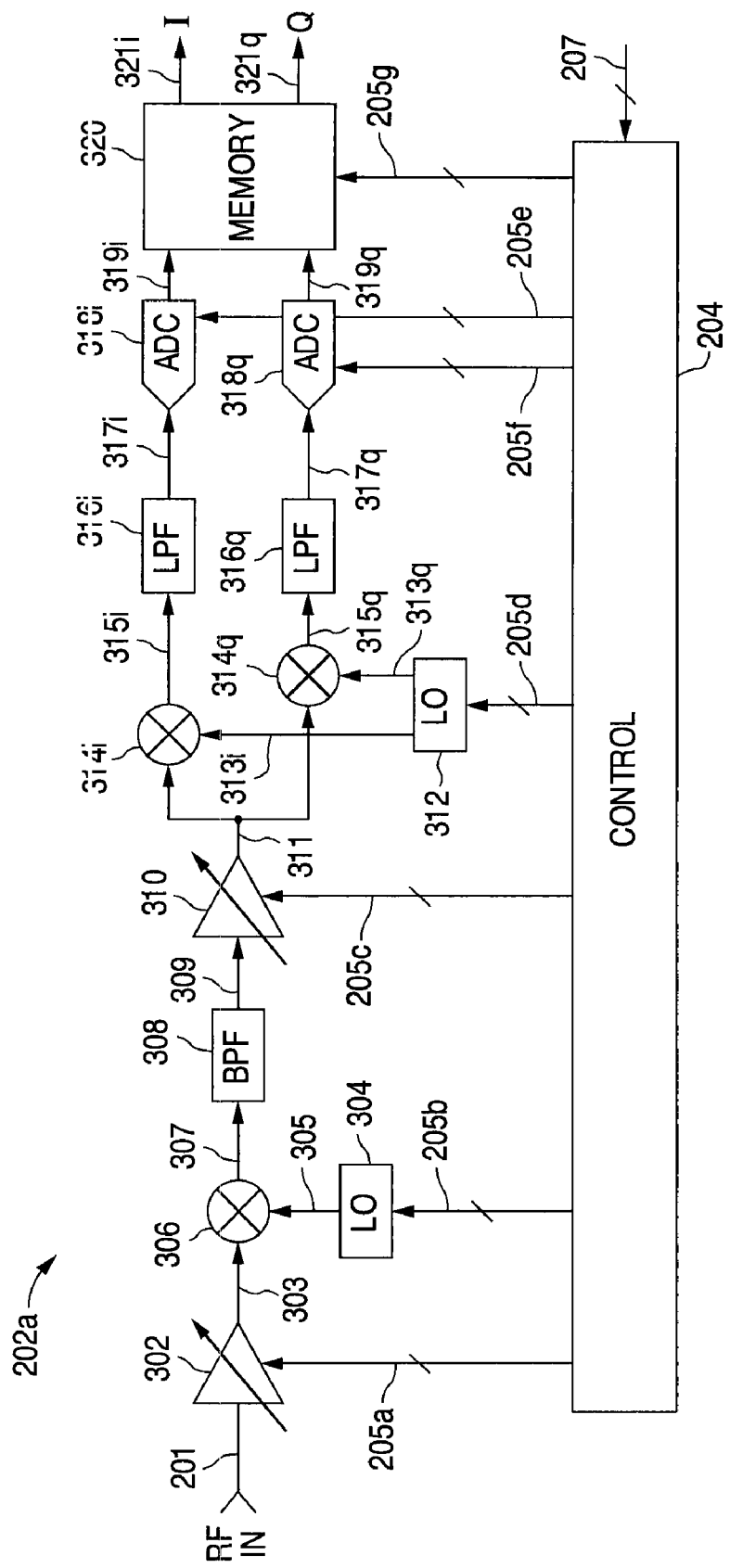
FIG. 3 is block diagram of the receiver subsystem of FIG. 2.

Referring to FIG. 3, one example embodiment 202a of the receiver 202 includes a number of conventional elements connected in a conventional manner, substantially as shown. The incoming RF signal 201 is amplified by a variable gain amplifier 302 in accordance with control signals 205a from the controller 204. The resulting signal 303 is frequency down-converted in a mixer 306 with a local oscillator (LO) signal provided by a first LO 304 which is controlled by control signals 205b from the controller 204. The resulting down-converted signal 307 is filtered by a bandpass filter 308. The filtered signal 309 is amplified with another variable gain amplifier 310 in accordance with control signals 205c from the controller 204.

The down-converted and filtered signal 311 is further frequency down-converted in mixers 314i, 314q with quadrature LO signals 313i, 313q from a second LO 312 which is controlled by control signals 205d from the controller 204. The resulting baseband quadrature signals 315i, 315q are filtered with lowpass filters 316i, 316q. (It should be readily understood that a single down-conversion can be performed instead, e.g., where incoming RF signal 201 is amplified by one variable gain amplifier 310 and the second LO 312 provides the quadrature LO signals 313i, 313q at an appropriate frequency for the lowpass filters 316i, 316q.) The filtered signals 317i, 317q are quadrature data signals in analog form, and are converted to digital data signals 319i, 319q by analog-to-digital converters (ADCs) 318i, 318q, which are controlled by control signals 205e, 205f from the controller 204. These data signals 319i, 319q are stored in a memory 320 for availability as in-phase 321 i and quadrature phase 321q data signals in accordance with control signals 205g from the controller 204.

Figure 4A:
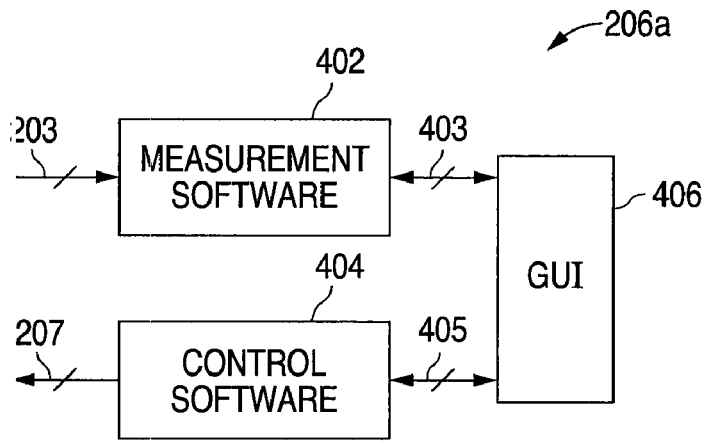
FIGS. 4A and 4B are block diagrams depicting alternative embodiments of the interface/computer of FIG. 2.

Referring to FIG. 4A, one embodiment 206a of the interface 206 includes a computer programmed with measurement software 402 and control software 404. Operation by the user is performed via a graphical user interface 406, which communicates with the measurement 402 and control 404 software through data 40 and control 405 information.

Figure 4B:
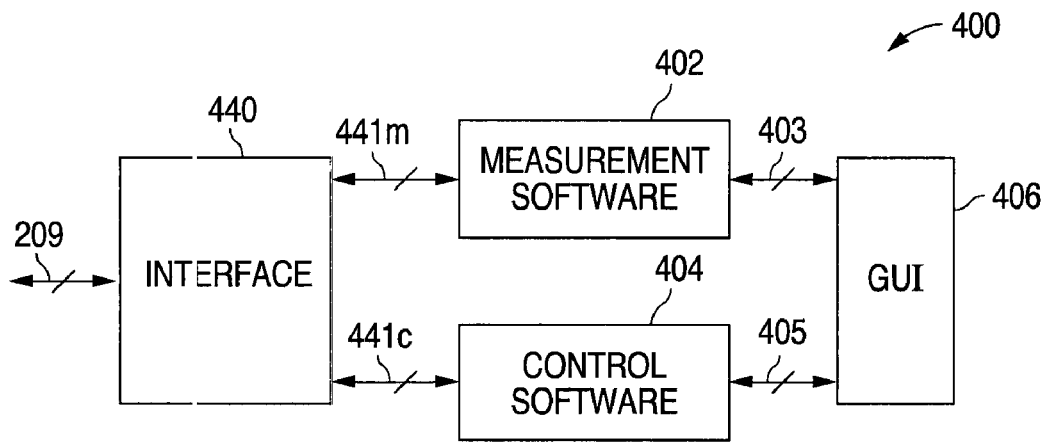

Referring to FIG. 4B, when an external computer is used, such computer 400 includes an interface 440 through which the measurement software 402 and control software 404 interact with the local interface 206 via the network connection 209. Data 441m and control 441c information are exchanged between the interface 440 and the measurement 402 and control 404 software.

Figure 5:
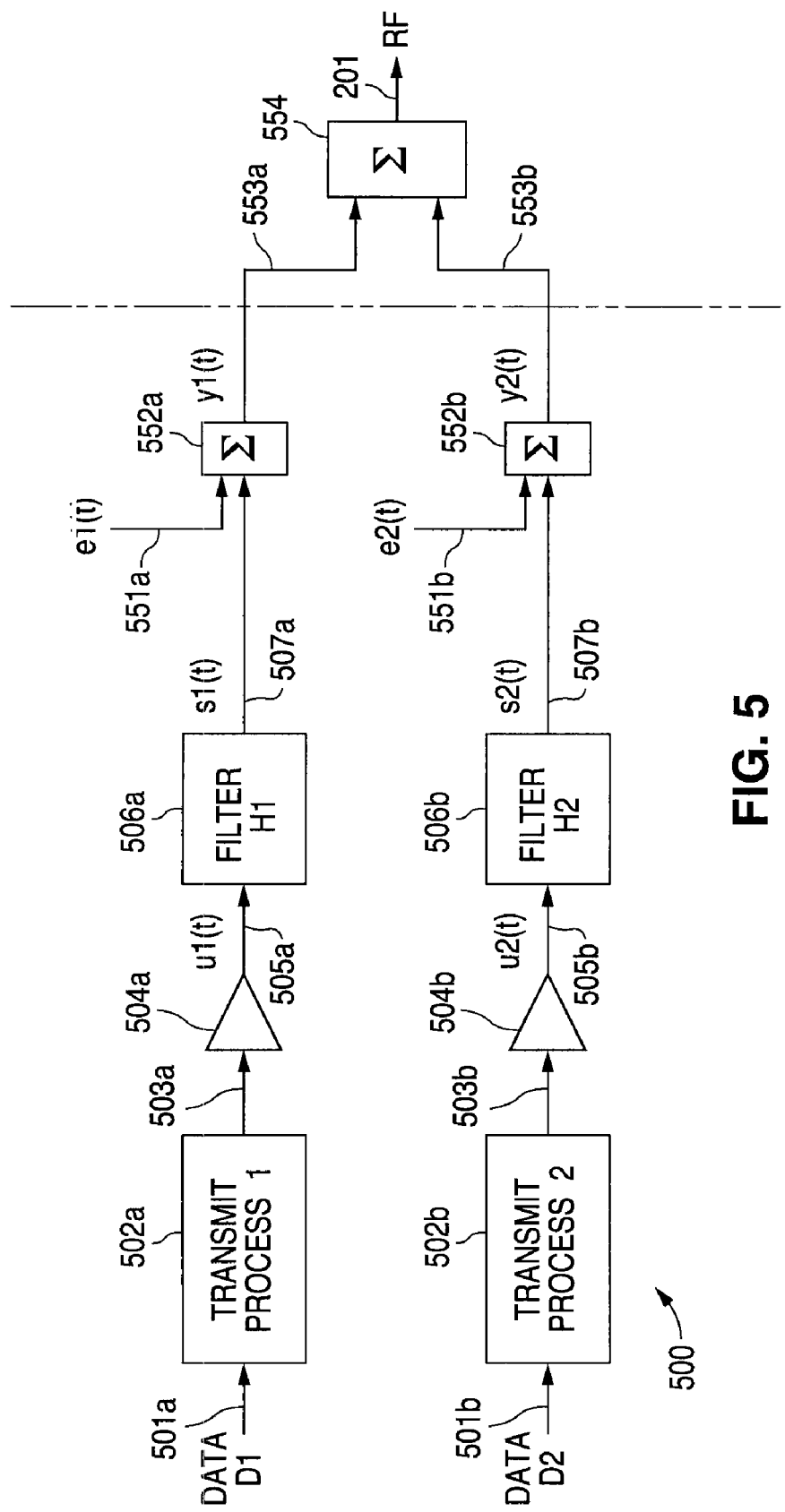
FIG. 5 is a block diagram depicting multiple OFDM transmitters to be tested in accordance with one embodiment of the presently claimed invention.

Referring to FIG. 5, the RF signal 201 to be tested with a method in accordance with one embodiment of the presently claimed invention is the combination of two or more (two in this example) transmit signals from a similar number of transmitters. In this example, the set 500 of transmitters to be tested include two signal transmission systems. The data 501a, 501b to be transmitted are processed in accordance with transmit processes 502a, 502b. The resulting signals 503a, 503b are amplified with amplifiers 504a, 504b to produce time domain data signals 505a, 505b which are filtered by filters 506a, 506b to produce the time domain data signals 507a, 507b for transmission. The filters 506a, 506b provide modeling of linear distortions, while other forms of distortion (e.g., amplifier noise, nonlinear amplifier and mixer distortions, I/Q imbalances, phase noise, etc.) are modeled by additive error signals 551a, 551b which are introduced via signal combiners 552a, 552b. The resulting signals 553a, 553b are summed in a signal combiner 554 to produce the RF signal 201.

Figure 5A:
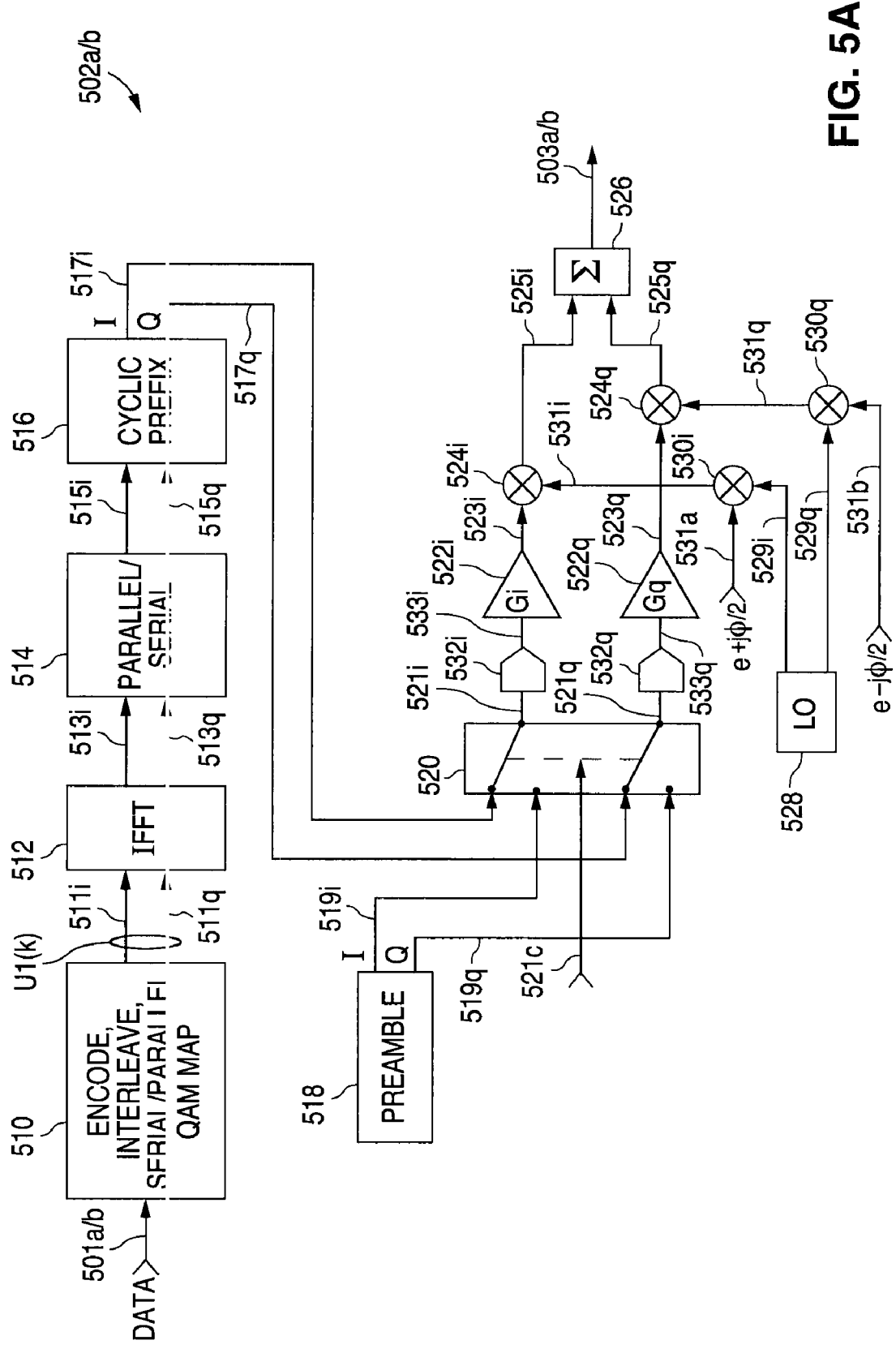
FIG. 5A is a block diagram depicting one example embodiment of the transmit process stages of FIG. 5.

Referring to FIG. 5A, one example embodiment of the transmit processes 502a 502b can be described as follows. The incoming data 501a, 501b is initially processed by a process 510 in which the incoming data is encoded, interleaved, converted from serial to parallel form, and mapped according to quadrature amplitude modulation (QAM). The resulting quadrature signals U1(k) 511i, 511q are processed according to an inverse Fast Fourier Transform (IFFT) 512, following which the resulting signals 513i, 513q are converted from parallel to serial form in a conversion process 514. The resulting serial signals 515i, 515q have a cyclic prefix added in the next process 516, thereby producing the quadrature data signals 517i, 517q for transmission.

A preamble generator 518 produces the quadrature preamble signals 519i, 519q. The data 517i, 517q and preamble 519i, 519q signals are provided to a signal router, e.g., switch 520. In accordance with a control signal 521c, the router 520 selects the preamble signals 519i, 519q, followed by the data signals 517i, 517q. The selected signals 521i, 521q are converted by digital-to-analog converters (DACs) 532i, 532q to analog signals 533i, 533q prior to being buffered in buffer amplifiers 522i, 522q and mixed in signal mixers 524i, 524q with quadrature conversion signals 531i, 531q (discussed in more detail below), with the resultant signals 525i, 525q summed in a signal combiner 526 to produce the output signals 503a, 503b.

A local oscillator circuit 528 provides quadrature local oscillator signals 529i, 529q which are mixed in signal mixers 530i, 530q with quadrature signals 531a, 531b which are used to model the quadrature imbalance of the signal transmission path, thereby producing the quadrature local oscillator signals 531i, 531q. The signal gains Gi, Gq of the buffer amplifiers 522i, 522q are used to model the amplitude imbalance of the quadrature signal transmission path.

Figure 6:
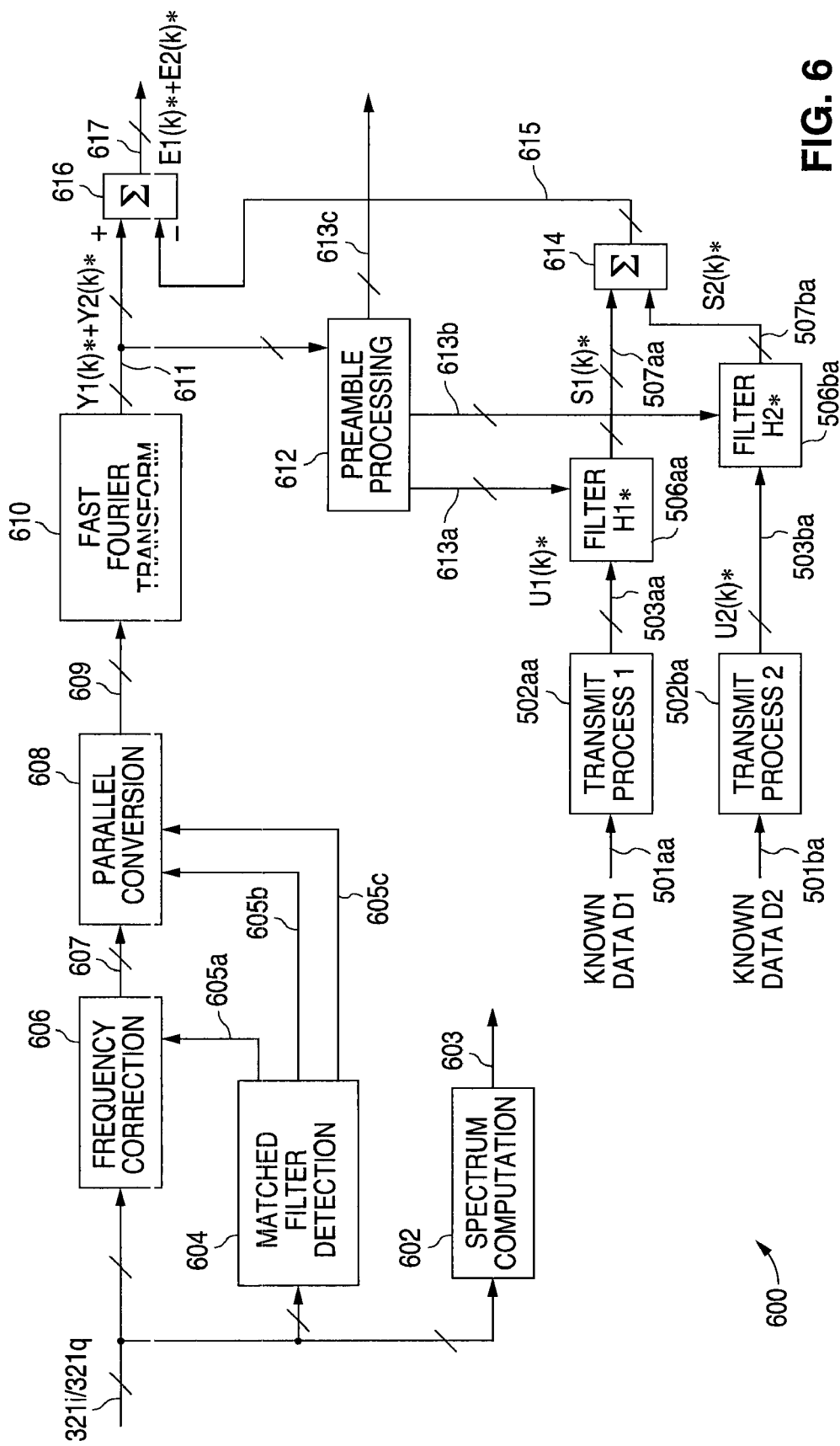
FIG. 6 is block diagram depicting processes involved in practicing a testing method in accordance with various embodiments of the presently claimed invention.

Referring to FIG. 6, the measurement software 402, in accordance with one embodiment of the presently claimed invention, performs a number of tests and operations which can be represented as a process flow 600. The incoming sampled data vector 321i/321q is used in a number of processes, including spectrum computation 602, matched filter detection 604 and frequency correction 606. The spectrum computation 602 provides data 603 representing the power spectrum of the combined signal, e.g., by averaging the results of Fast Fourier Transform (FFT) processes.

The matched filter detection process 604 detects the start of the signal, symbol boundaries and frequency error for the incoming signal 321i/321q. Frequency error information 605a is provided to the frequency correction process 606, while start of signal 605b and symbol boundaries 605c information are provided to a parallel conversion process 608.

The incoming signal 321i/321q has its nominal frequency corrected in the frequency correction process 606 in accordance with the frequency error information 605a. The corrected signal information 607 is converted to parallel signal information by the parallel conversion process 608 in accordance with the start of signal 605b and symbol boundary 605c information.

The parallel signal information 609 is processed using a FFT process 610 to produce frequency domain information Y1(k)*+Y2(k)* 611 corresponding to the original data transmission signal 201. This information 611 is provided to a preamble processing process 612 (discussed below). Additionally, a summing process 616 further processes this information 611 by subtracting reference signal information 615 (discussed below) to produce the error signal in the frequency domain 617 present in the original data transmission signal 201.

The preamble processing process 612 produces control data 613a, 613b for filter processes 506aa, 506ba (discussed below). Additionally, it produces data 613c representing the power level of each of the data transmission signals 553a, 553b, data representing imbalances between the I and Q data signals for each transmitter (e.g., phases and amplitudes as discussed above for FIG. 5A), and the spectral flatness of each data transmission signal (amplitude of each OFDM carrier in the data transmission signals 553a, 553b).

For testing purposes, the original data being transmitted by the transmission system 500 under test is known, and is provided as known data 501aa, 501ba for duplicate transmit processes 502aa, 502ba within the measurement software 402. The resulting duplicate frequency domain data signals $U1(k)^*$ 503aa, $U2(k)^*$ 503ba are filtered by filtering processes 506aa, 506ba intended to simulate the original filters 506a, 506b of the transmission system 500, in accordance with the filter control data 613a, 613b. The resulting filtered data $S1(k)^*$ 507aa, $S2(k)^*$ 507ba are summed in a combining process 614 to produce the reconstructed ideal transmitted signal 615, which is subtracted from the received signal 611 to produce the composite error signal $E1(k)^*+EY2(k)^*$ 617. Using standard formulas, the EVM can be computed from this composite error signal 617.

It should be readily understood that the known data 501aa, 501ba may have been processed within the set 500 of transmitters by a scrambler (e.g., within the transmit processes 502a, 502b) with an unknown starting state. Such an uncertainty can be resolved within the receiver 600 using a process by which data retrieved from the incoming signal 321i/321q is correlated against all possible scrambler starting states.

Based upon the foregoing discussion, the signal measurements, as depicted in FIG. 6, can be summarized as follows: The beginning of the incoming signal and symbol boundary are detected, e.g. using a matched filter for the preamble. The output of the matched filter is used for deriving the signal carrier frequency offset, from which the appropriate frequency correction can be computed and applied in the time domain. (It should be readily understood that other well known techniques can be used to achieve this as well, e.g., power envelope detection or autocorrelation.)

The remaining portion of the incoming signal, e.g., data following the preamble, is processed using a Fast Fourier Transform (FFT), with each FFT output representing one symbol. With each FFT output having N values, a subset N1 of these values represent orthogonal frequency division multiplexed (OFDM) signal carriers containing information. Typically, the value N has a power of two and N1 is approximately equal to N−10. The MIMO preamble structure used for M transmitters allows setting up M equations with M unknowns for each OFDM carrier N1 present in the transmitted signals $Y1(k)$, $Y2(k)$. Solving these equations provides estimates of the amplitude and phase responses H1, H2 for each carrier transmitted in these signals $Y1(k)$, $Y2(k)$. The channel flatness is determined by the amplitude responses of the filters H1, H2, while the power level is determined by summing the power of each carrier in the transmitted signals $Y1(k)$, $Y2(k)$, and the I/Q imbalance is computed by evaluating the correlation between the positive and negative carriers around the center frequency for each of the transmitted signals $Y1(k)$, $Y2(k)$.

Since the content of the preamble is known a priori, and because the incoming preambles have distinct cyclic shifts, the signals from the various transmitters can be separated for each carrier signal. With different multiple input, multiple output (MIMO) implementations, different preambles can be used, with such preambles being designed to be at least substantially orthogonal. If the original data is known, the transmitters 500 can be operated with scrambling enabled, since the scrambler setting can be derived with a matched filter, and if the scrambler setting is known, the desired reference signal can be derived.

As a result of the foregoing, the power level for each carrier signal from each transmitter can be established, from which the useful power from each transmitter can be determined, as well as the spectral flatness, i.e., the uniformity of signal powers across the frequency spectrum. The power and phase of each carrier signal for each transmitter is indicative of the channel response for each transmitter, as modeled in the filter processes 506aa, 506ba.

By comparing these separated transmitter signals, the quadrature (I/Q) imbalance for each transmitter can be derived.

If the data content is known, as is expected during testing conditions (while accounting for scrambler uncertainties, as discussed above), the error vector magnitude (EVM) can be calculated by comparing the outputs of the FFT process with the ideal FFT outputs following application of the channel corrections. Computation of the phase noise can be performed in a similar manner. By averaging the FFT outputs, the power spectrum of the combined signal can be computed.

Relative timing can be determined according to the locations of the peaks of the outputs of the matched filter 604.

Figure 6A:
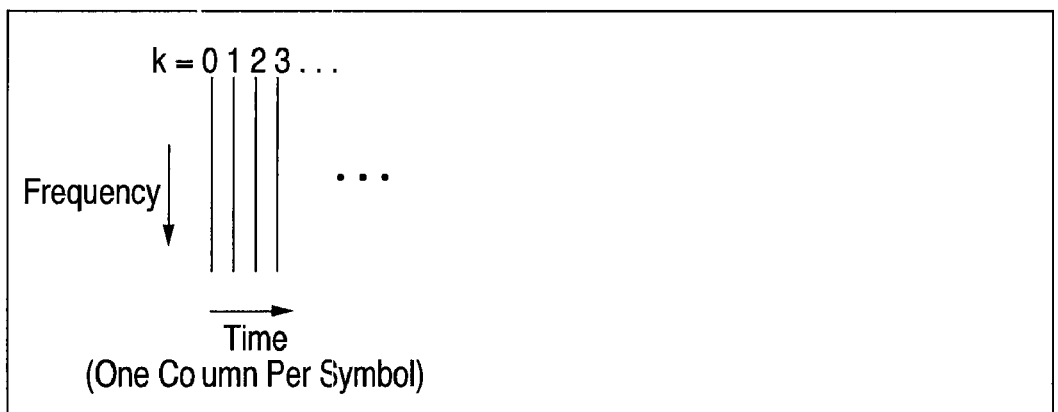
FIGS. 6A and 6B depict selected signals identified in FIG. 6 in their time and frequency domains.
Figure 6B:
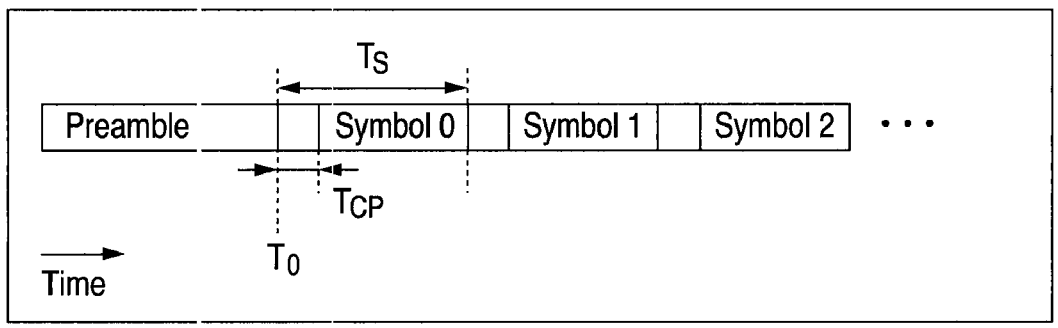

Referring to FIGS. 6A and 6B, using frequency domain data signal $U1(k)^*$ 503aa as an example, the time and frequency domain relationships among the signals can be described as follows. Referring to FIG. 6A, signal $U1(k)$ is sequence of column vectors, each having a number N of FFT elements, with each column representing a symbol of the packet in the frequency domain. For example, for an IEEE 802.11 a/g signal that number N is typically 64 and the IFFT and FFT functions are performed with 64 element vector inputs. Signal $U1(k)$ is the column vector for the k-th symbol in the packet. Referring to FIG. 6B, signal $u1(t)$ is the time domain signal corresponding to $U1(k)$ (length of preamble not to scale). For example, the frequency domain vector $U1(2)$ corresponds to time domain signal $u1(t)$ over a time interval t as follows:

$$T_0+T_{CP}+2.T_s<t<T_0+3.T_s$$

Frequency domain signal $U1(k)$ can be derived from time domain signal $u1(t)$ as follows:

$$U1(k)=FFT(u1(t).e^{-j\omega t})$$

where: $t=m\,T_{sa}-k\,T_s+T_0+T_{CP}$
$\omega=2\,\pi f_c$ with $f_c$ the frequency of the local oscillator signals 529i, 529q
$T_{sa}=1$/sample clock frequency of digital-to-analog converter
$T_s$=symbol duration, including cyclic prefix
$T_0$=start of first symbol after preamble
$T_{CP}$=duration of cyclic prefix
k=symbol number
m=sample number (e.g., for IEEE 802.11 a/g m=0:63)

As discussed above, MIMO transmitters can be tested in parallel where the outputs of the individual transmitters are combined, e.g., via a power combiner, to feed the combined signal into a single test instrument capable of performing true signal analysis. By using advanced signal processing algorithms many individual parameters can be extracted for the individual transmitters using the combined signal. This analysis is based on knowing the data that was transmitted, as well as the fixed portion of a MIMO data packet (e.g., a data packet header). This ability has great advantages in a production system as it allows parallel testing of a MIMO transmit system using only a single test instrument, thereby offering fast test speed and low cost, thus meeting the requirement of lowest possible production cost.

One desirable test would be that of measuring individual compression of the different transmitters used in a MIMO system and to assign a quality measure to each transmitter.

When a transmitter compresses the transmitted signal, this degrades the quality of the signal, which can be expressed via the EVM as a measure of how much the transmitted signal differs from an ideal signal. For OFDM signals the EVM is expressed as the difference between the constellation diagram for each carrier and the ideal constellation diagram, e.g., as set forth in the EVM requirements for the IEEE 802.11 a/g standards. One method to associate compression levels with individual transmit chains is by measuring the complementary cumulative distribution function (CCDF), which is a well known characteristic (this method is discussed in more detail below).

Figure 7:
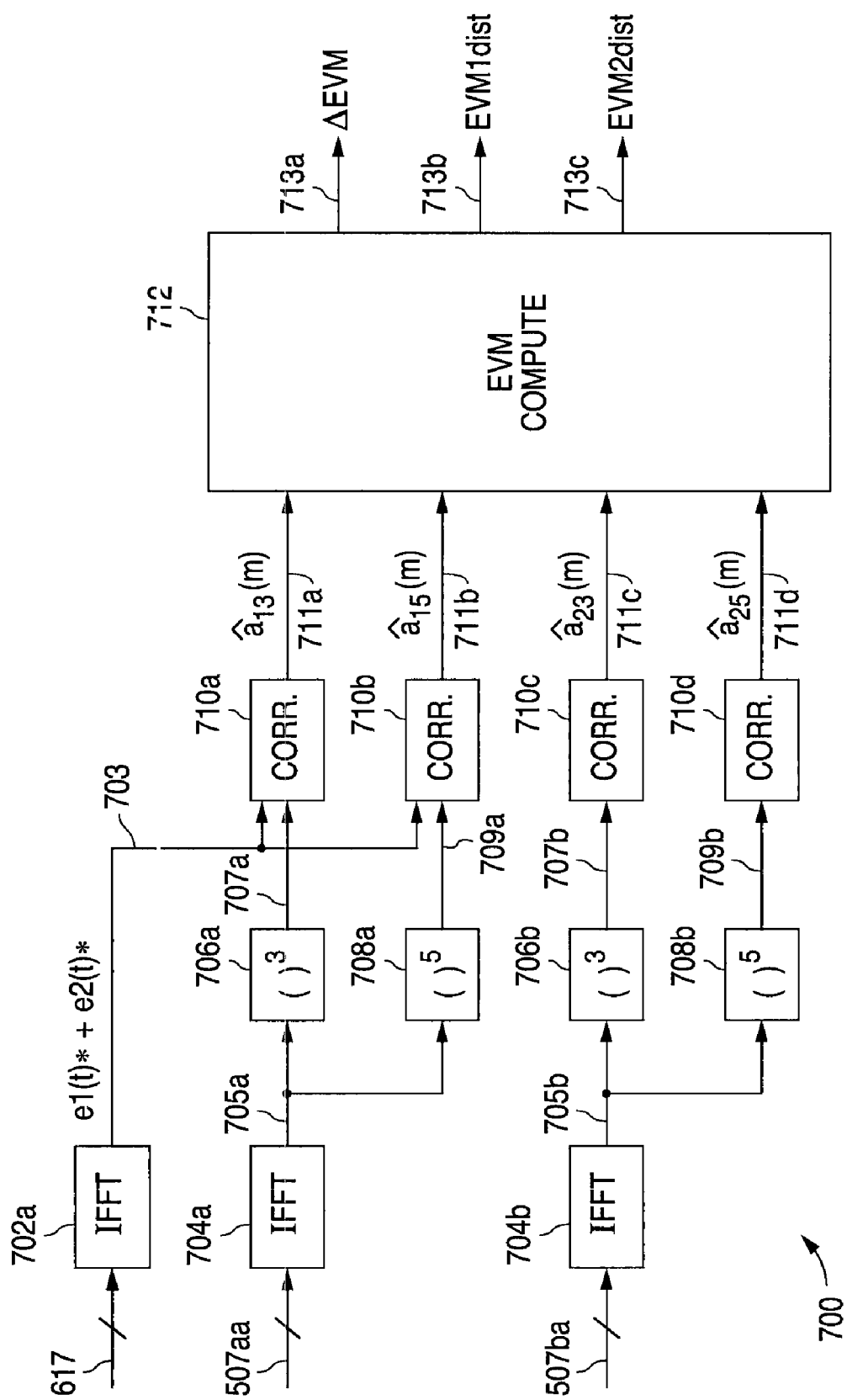
FIG. 7 is block diagram depicting a technique for characterizing non-linear behavior causing signal compression.

Referring to FIG. 7, another method is to characterize the non-linear behavior causing the compression. The output x(t) from a non-linear element, such as a power amplifier, can be expressed in terms of its input signal y(t) as follows:

$$x(t)=a_1*y(t)+a_3*y^3(t)+a_5*y^5(t)+$$

where $a_3$ and $a_5$ are the non-linear coefficients that determine the power of the third and fifth order responses. The quality of the signal of each transmitter in terms of its EVM can be derived from the compression characteristics, i.e., coefficients $a_3$ and $a_5$, for each transmitter from the composite signal.

The composite error signal 617, the first locally generated ideal transmitter signal 507aa, and the second locally generated ideal transmitter signal 507ba, which are in the frequency domain, are transformed to the time domain, one symbol at a time, through respective IFFT processes 702a, 704a, 704b. The first transmitter time domain signal 705a is processed according to third 706a and fifth 708a order non-linear processes. The results 707a, 709a are correlated with the composite error signal 703 $e_1(t)*+e_2(t)*$. The first correlator output 711a $\hat{a}_{13}$ is an estimate of the $a_3$ term for the first transmitter for each symbol, while the second correlator output 711b $\hat{a}_{15}$ is an estimate of the $a_5$ term for the first transmitter for each symbol. Similarly, the third correlator output 711c $\hat{a}_{23}$ is an estimate of the $a_3$ term for the second transmitter for each symbol, while the fourth correlator output 711d $\hat{a}_{25}$ is an estimate of the $a_5$ term for the second transmitter for each symbol. An EVM computation process 712 averages these estimates over the packet, with the averaged estimates used to address lookup tables to determine the expected EVM difference 713a between the transmitters and compression based EVM estimates 713b, 713c.

Figure 8A:
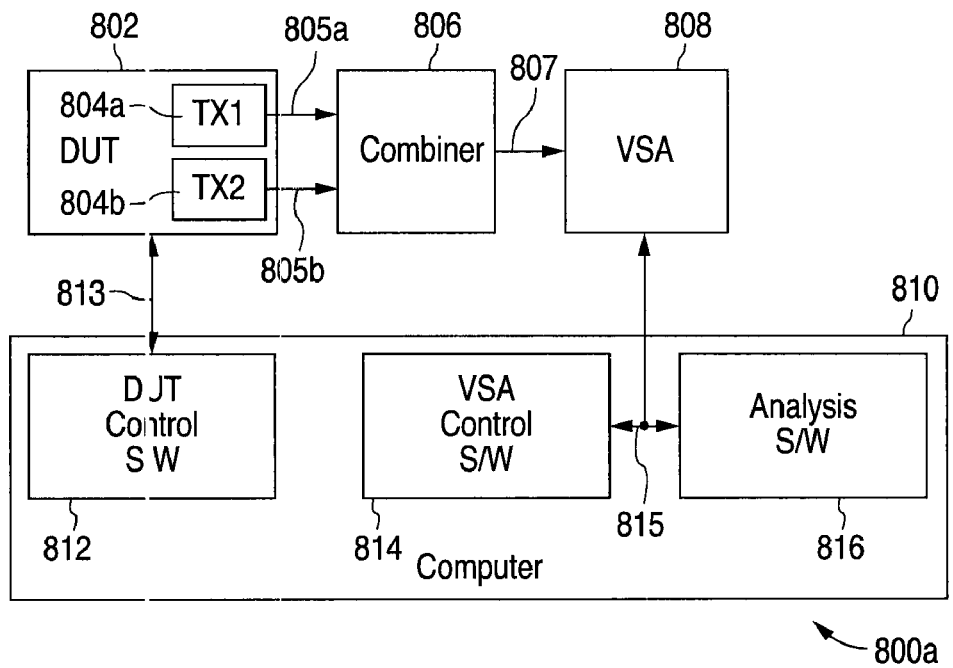
FIGS. 8A-8C are block diagrams depicting test equipment configurations for practicing the presently claimed invention.

Referring to FIG. 8A, a test configuration 800a includes the DUT 802 with multiple (e.g., two) transmitters 804a, 804b, a signal combiner 806, a VSA 808, and a computer 810. The computer 810 contains and runs DUT control software 812 which provides instructions and data to and receives data from the DUT 802 via an interface 813, and VSA control software 814 and analysis software 816 which exchange data and instructions mutually as well as with the VSA 808 via another interface 815.

Figure 8B:
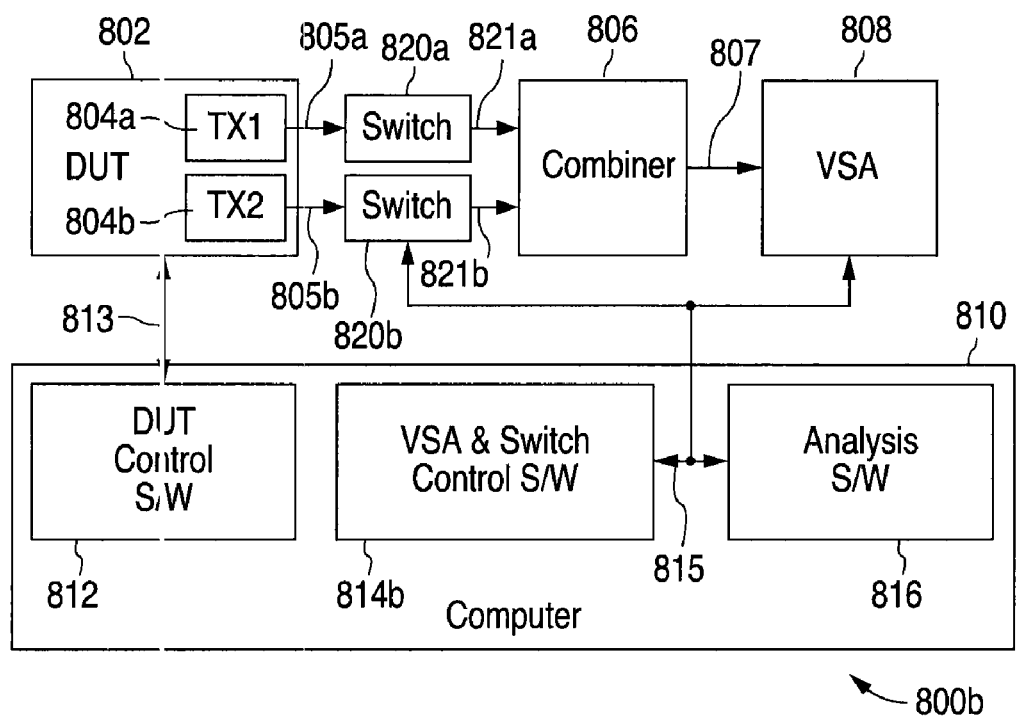

Referring to FIG. 8B, in an alternative test configuration 800b, switches 820a, 820b are interposed between the transmitters 804a, 804b and signal combiner 806, and controlled by instructions from VSA and switch control software 814b in the computer 810.

Figure 8C:
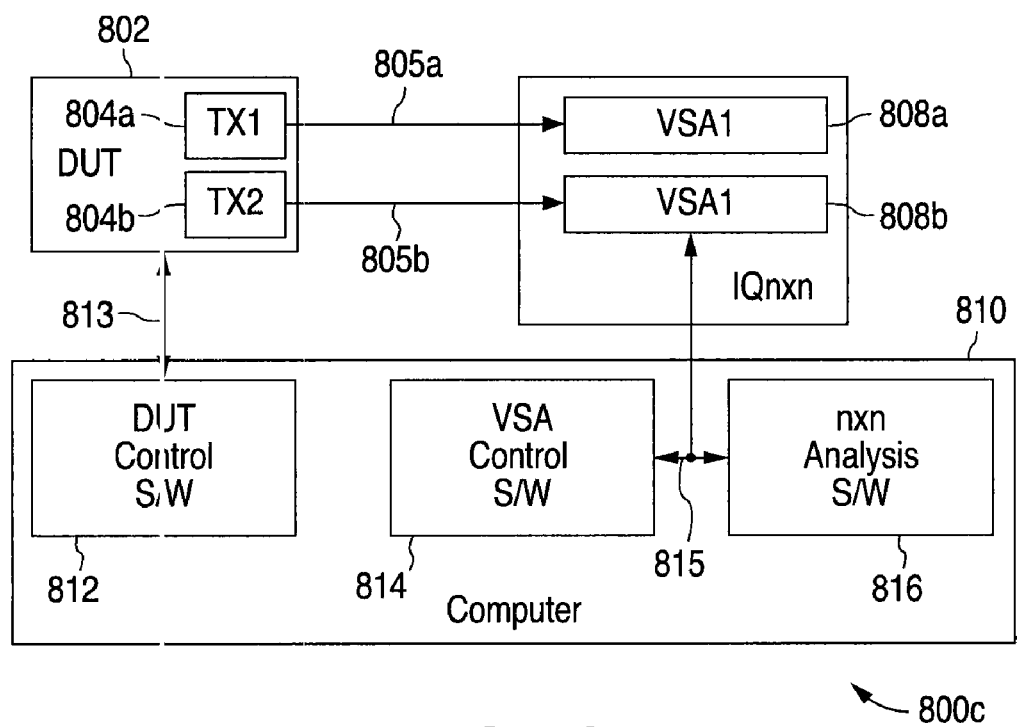

Referring to FIG. 8C, in an alternative test configuration 800c, the signal combiner 806 is removed and each transmitter output 805a, 805b is measured directly by its own VSA 808a, 808b.

Referring again to FIG. 8A, according to one test configuration, the first transmitter 804a was operated at a constant output signal 805a compression thereby producing an EVM of −32 dB, while the compression of the second transmitter 804b was varied. The EVM of the second transmitter 804b was measured using the single VSA 808. To obtain an EVM reference, the EVM from the second transmitter 804b was measured directly with the VSA 808 connected to the second transmitter 804b only, i.e., without the signal 805a of the first transmitter 804a being added.

Figure 9A:
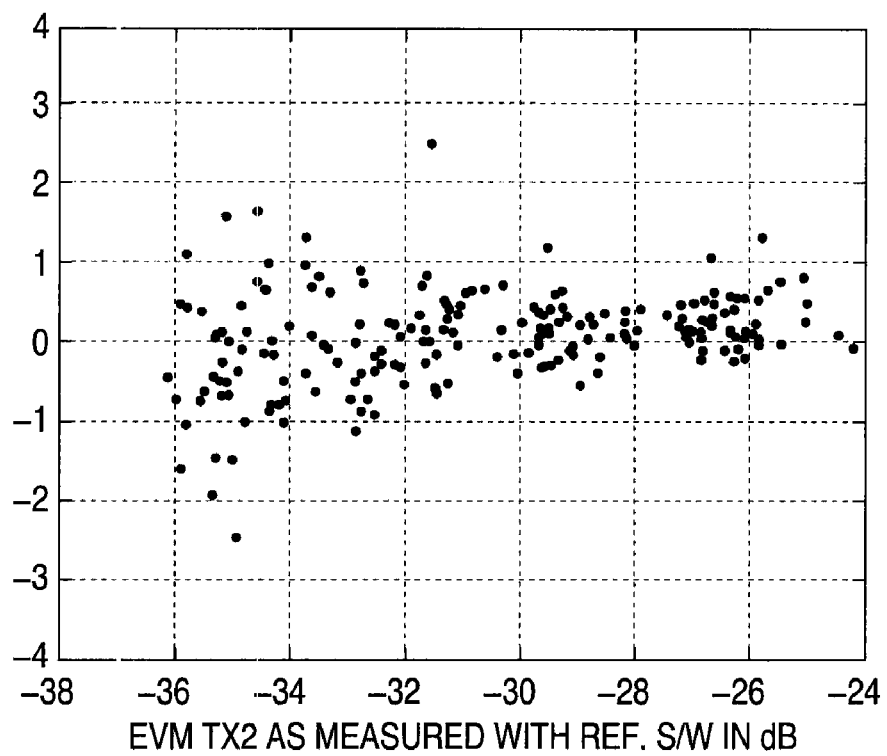
FIGS. 9A-9B graphically depict results of signal EVM measurements.
Figure 9B:
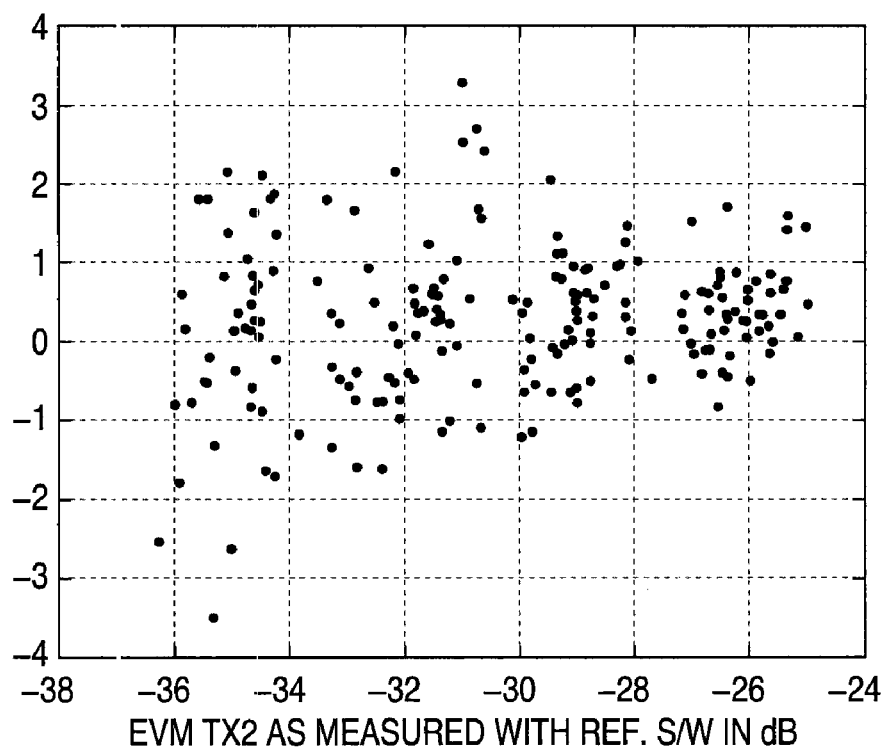

Referring to FIGS. 9A and 9B, the EVM of the two measurements can be compared. The horizontal axis shows the EVM of the second transmitter 804b when analyzed with the reference software. The vertical axis shows the error (in dB) in the EVM when using the composite measurement technique. For this particular test, intended for use with an IEEE 802.11 a/g system, the range of EVM of particular interest is between −24 and −27 dB, as the acceptance limit for the highest data rate is −25 dB. FIG. 9A illustrates the case where the two transmitters are set to transmit at equal power (pre-compression), while FIG. 9B illustrates the case where the first transmitter 804a is at a level one decibel higher than the second transmitter 804b. In the range of interest, the error shows a small positive bias with FIG. 9A having an error range of +/−1 dB and FIG. 9B having an error range of +/−1.5 dB. These tests were performed with relatively short packets of only 24 symbols. Increasing the length of the packets will improve the accuracy.

Figure 10A:
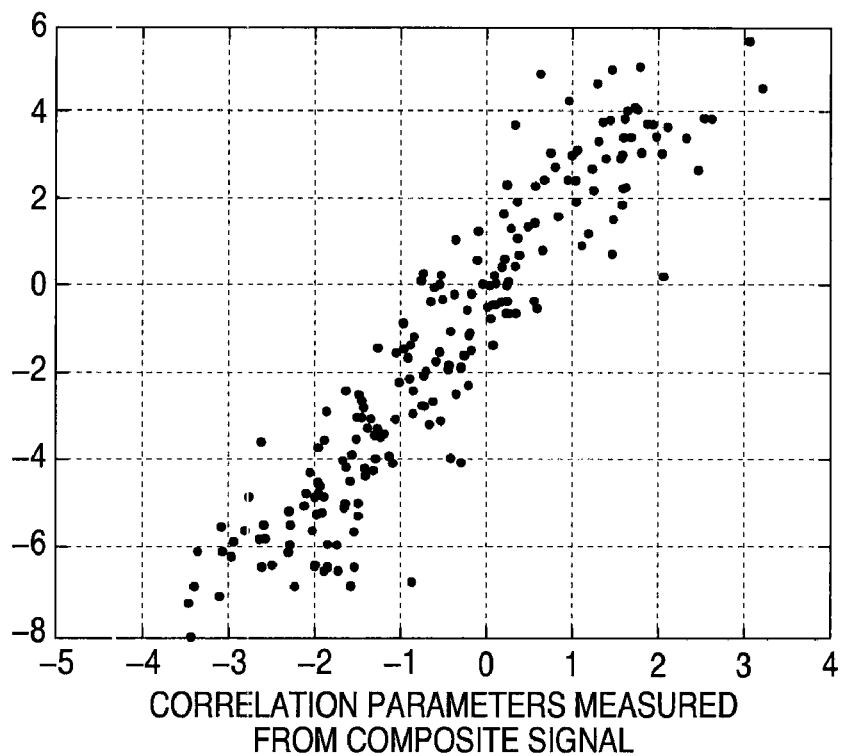
FIGS. 10A-10B graphically depict results of signal correlation measurements.
Figure 10B:
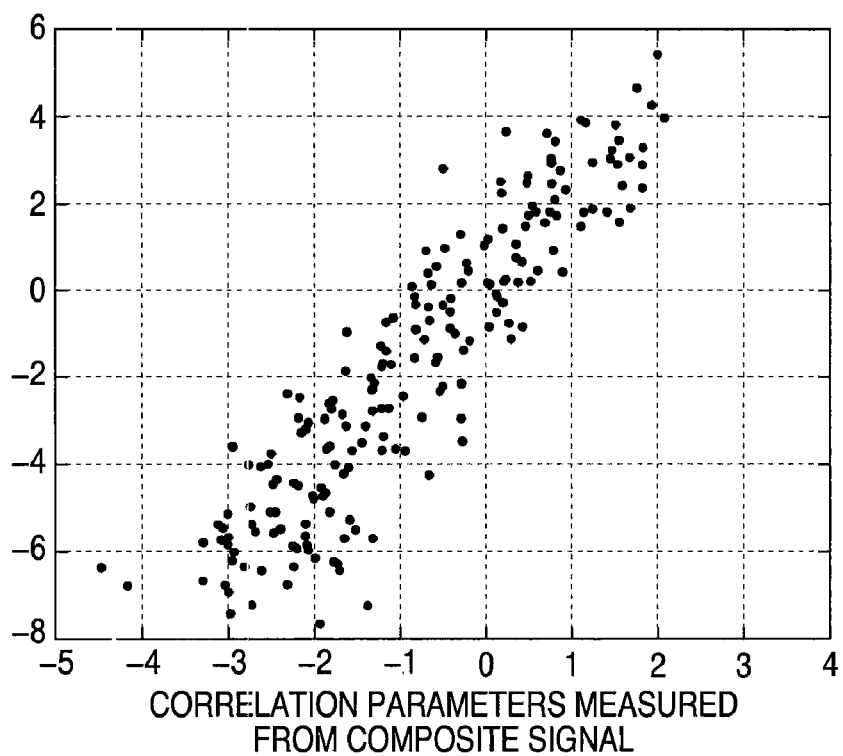

Referring to FIGS. 10A and 10B, the EVM of each transmitter 804a, 804b can be affected by other impairment sources. By comparing the correlation levels from the different transmit chains, the compression of each transmitter can be monitored. With the horizontal axis as a function of the ratio of the third order correlation coefficients (=10* $\log_{10}$ (average($\hat{a}_{13}$)/average($\hat{a}_{23}$))) and the vertical axis as the difference in EVM between the transmitters 804a, 804b, FIG. 10A illustrates the case where the transmitter output signals 805a, 805b are equal in power prior to compression (no non-linearity), while FIG. 10B illustrates the case where the first transmitter 804a is at a level one decibel higher than the second transmitter 804b.

Another desirable test is that of measuring individual compressions of the different transmitters used in a MIMO system. Compression is often measured in form of CCDF in signals with high peak to average ratio, e.g., OFDM signals, and offers significant information that can help verify the performance of a transmitter. In a well designed system, the transmitted signal power is adjusted to a certain level of compression such that the transmit quality requirement is satisfied. Decreasing the output signal power will cause increased power supply current consumption, but increasing the power will bring the system into deeper output signal compression thereby causing the transmit quality to degrade to the point where system performance may be limited by poor transmit quality.

Figure 11A:
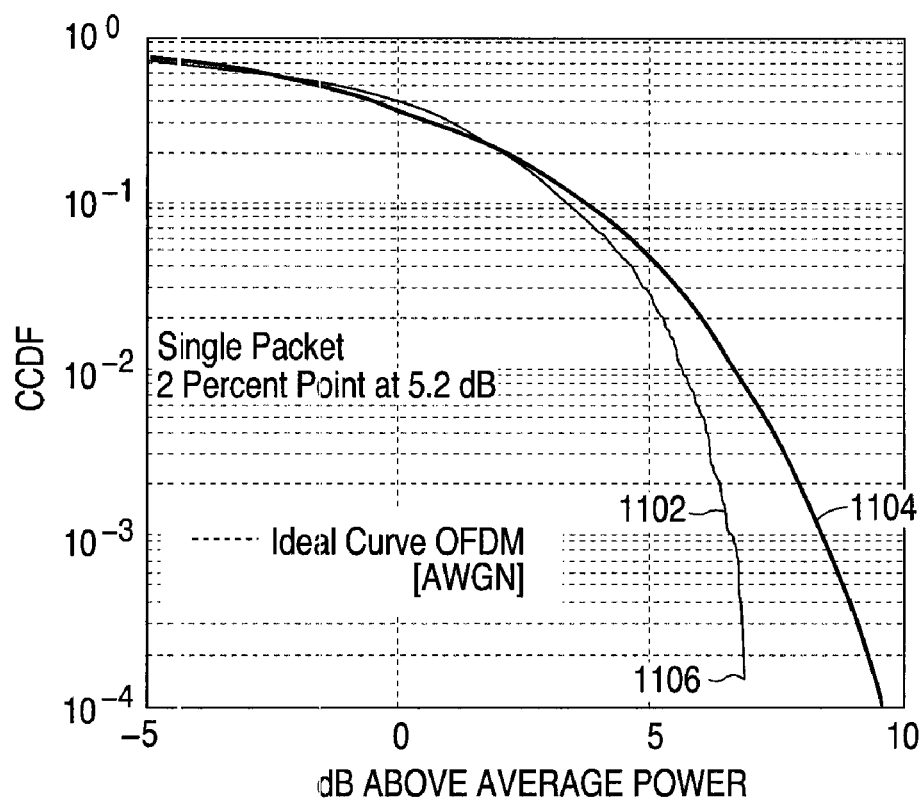
FIGS. 11A-11B graphically depict CCDF curves.

Referring to FIG. 11A, a typical CCDF curve for an IEEE 802.11a/g (OFDM) transmitter presents the probability for the signal to have X-dB or more instantaneous power relative to the average power. Curve 1102 represents the measured CCDF of a typical well designed transmitter, while curve 1104 represents the theoretical CCDF if there is no signal compression. The offset relative to the average power is on the horizontal axis and the probability is on the vertical axis. The end point 1106 of the compressed CCDF curve can represent a level of compression, as it indicates the degree of compression of the highest peaks of the input signal. In this example, the output signal is compressed about 3 dB relative to the theoretical signal. This point 1106 may vary some with shorter data packets, as the packet contents (uncompressed) may not precisely follow the theoretical curve 1104 due to the relatively low probability to get to this level of peaking. Therefore, this point 1106, while often used to visually identify compression, should only be seen as an indication of compression.

A CCDF is by itself a relatively simple function to derive. The problem is that in a production setup, one is typically looking for a signal with high compression, e.g., caused by a bad circuit component. In a single transmitter system one will easily be able to identify the compression (FIG. 11A) where the higher curvature is an indication of compression. A signal can exhibit up to 10 dB peak power relative to the absolute power, but the measured transmitter output may only show about 7 dB of peaking; thus the transmitter will compress the highest peaks to about 7 dB. Because these peak levels are relatively rare, such compression will generally not affect the transmitter performance enough to prevent recovery of the transmitted data based on normal performance margins and error correction. This is also true for MIMO systems if both transmitters show the same compression.

However, a MIMO system with a faulty transmitter may produce both a compressed signal and a non-compressed signal, thereby exhibiting different signal transmission properties. If the signal peaks are uncorrelated, such as for a multi-stream MIMO signal, it may be difficult to measure compression by looking at the combined signal. If both signals show no compression, the absolute peak would be 3 dB above the peak of each signal. However, the RMS power is also 3 dB higher, so the maximum 10 dB peak to average is maintained. If one signal shows no compression and the other shows some compression, e.g., 7 dB maximum peak as discussed above (CCDF would stop at 7 dB), when the two signals are combined, the CCDF will show about 1.3 dB reduction in peaking (for equal RMS signal powers). If the compression in increased to 5 dB, the composite CCDF will only show 1.8 dB compression relative to the theoretical signal, and if it is further reduced to 3 dB peaking, the CCDF will show 2.2 dB relative to the theoretical signal. Typically, compression will limit performance of a transmitter to a peaking range between 6.5 dB and 7 dB, and if one of the two transmitters has failed, the overall MIMO system becomes faulty.

Figure 11B:
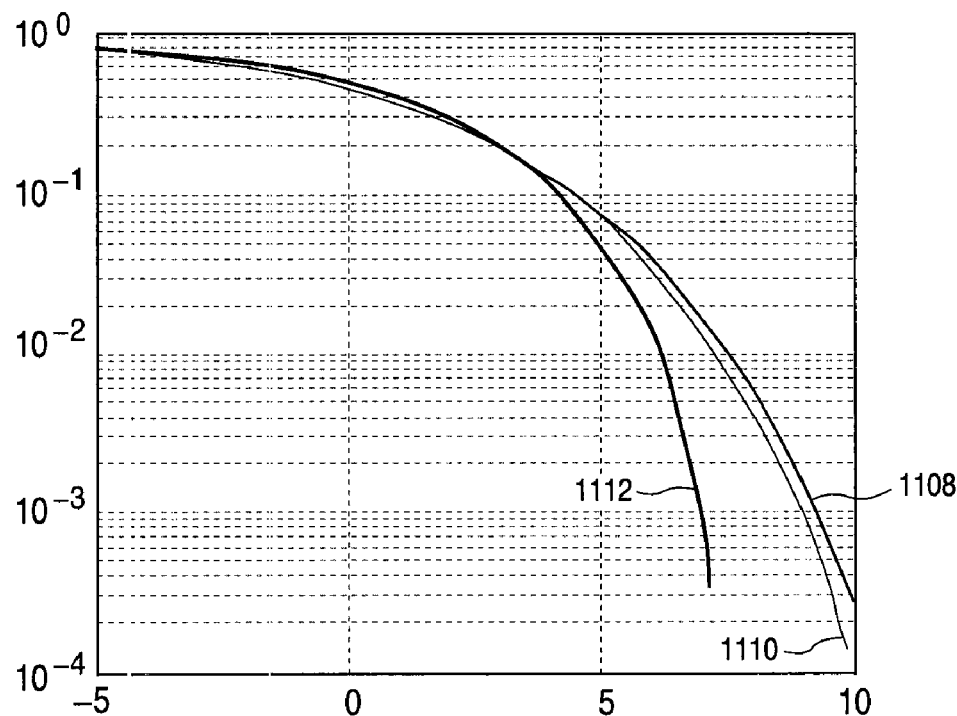

Referring to FIG. 11B, a comparison between CCDF curves for composite and individual CCDF for a dual-transmitter MIMO signal. Curve 1108 is the theoretical curve for the MIMO OFDM signal, while curve 1110 is the composite (combined) CCDF. The curve for the uncompressed input of one of the two MIMO transmitters is virtually identical to the theoretical curve 1108. Curve 1112 is for the other MIMO transmitter and indicates significant compression close to that for an optimally calibrated transmitter. From this it seems clear that using a measurement of CCDF on the combined signals provides very little information. One can hardly distinguish the combined signal from the theoretical one, while at the same time one of the transmitters are compressed to maximum for a good system. Therefore, it is not likely that one can adequately measure CCDF with a single traditional instrument capable of measuring CCDF as is often desired for a production test setup. However, CCDF is a desirable analysis tool which can often help improve production test speed, as it is a simple analysis and offers important insight into the signal composition.

By measuring the composite signal EVM, other contributors to the composite EVM can be identified, and by then also knowing the compression characteristics, it can be determined if the EVM contributions are similar for the different signal transmission paths or if the effects of one signal transmission path dominates the composite EVM.

Figure 12A:
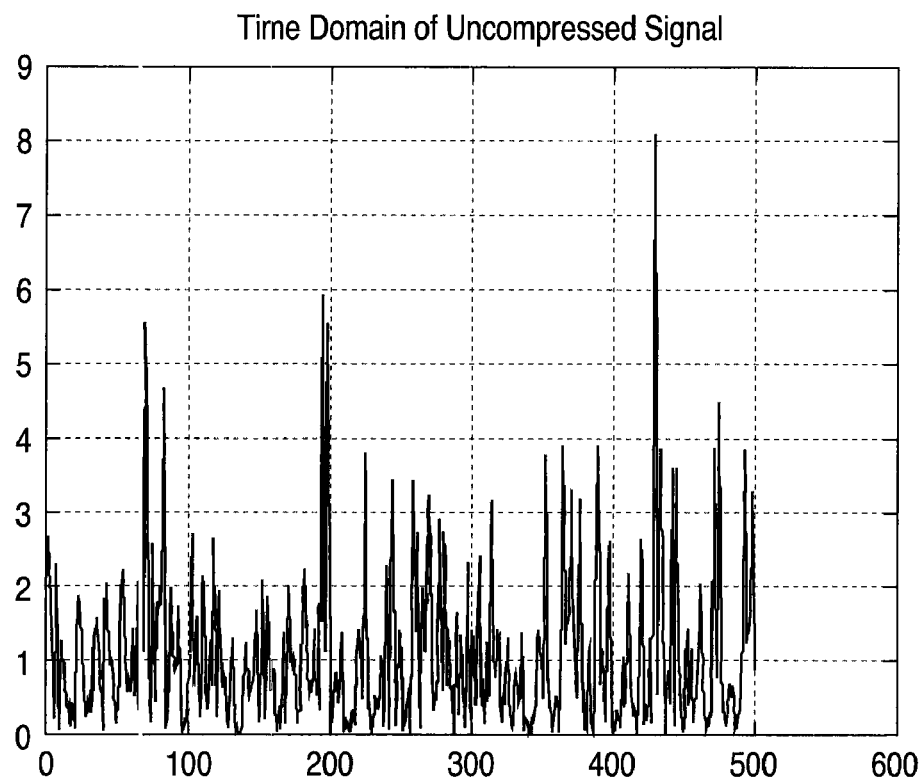
FIGS. 12A-12B, 13A-13B, 14A-14C and 15A-15D graphically depict various uncompressed, compressed and composite MIMO signals.
Figure 12B:
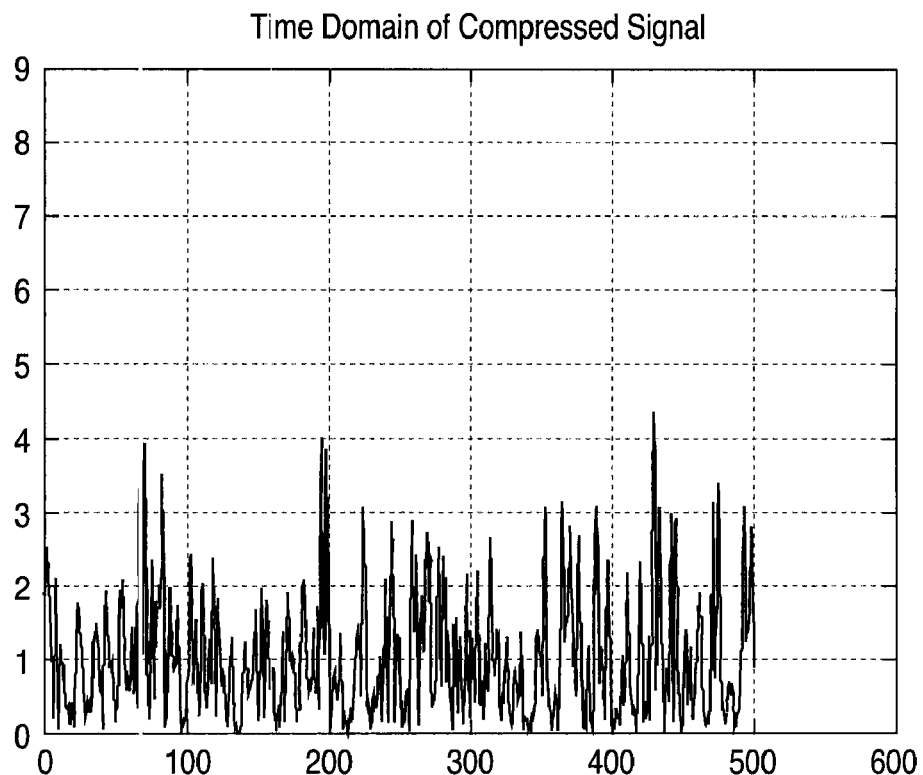

Referring to FIGS. 12A and 12B, a comparison, in the time domain, of a time sample of an ideal uncompressed signal (FIG. 12A) and a compressed version of the same time sample (FIG. 12B) will reveal CCDF characteristics similar to curve 1102 of FIG. 11A, and the fact that the compression does not affect the location of peaks, and attenuates larger peaks more than smaller peaks.

Figure 13A:
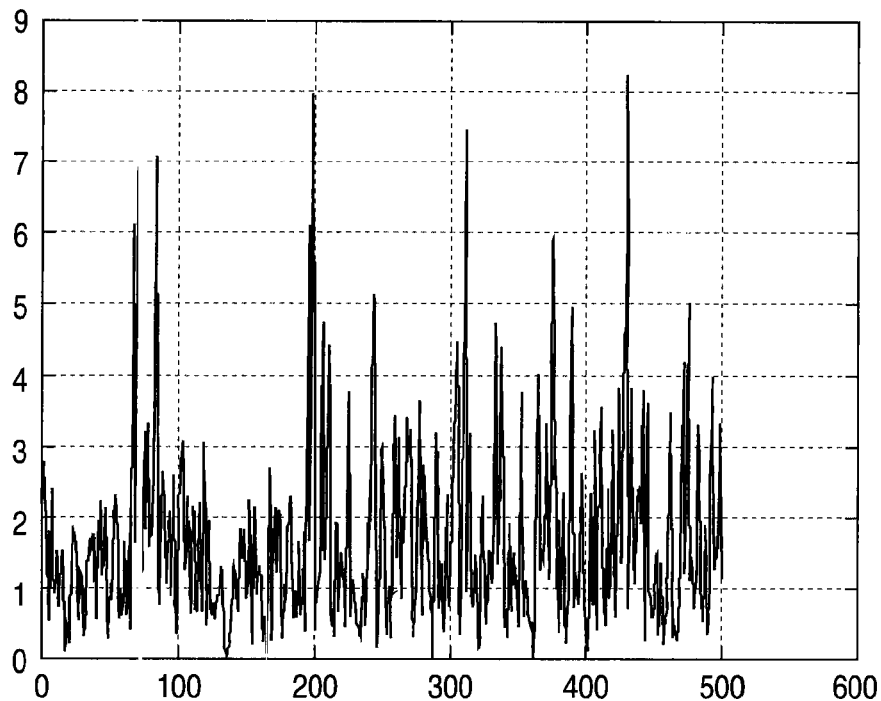
Figure 13B:
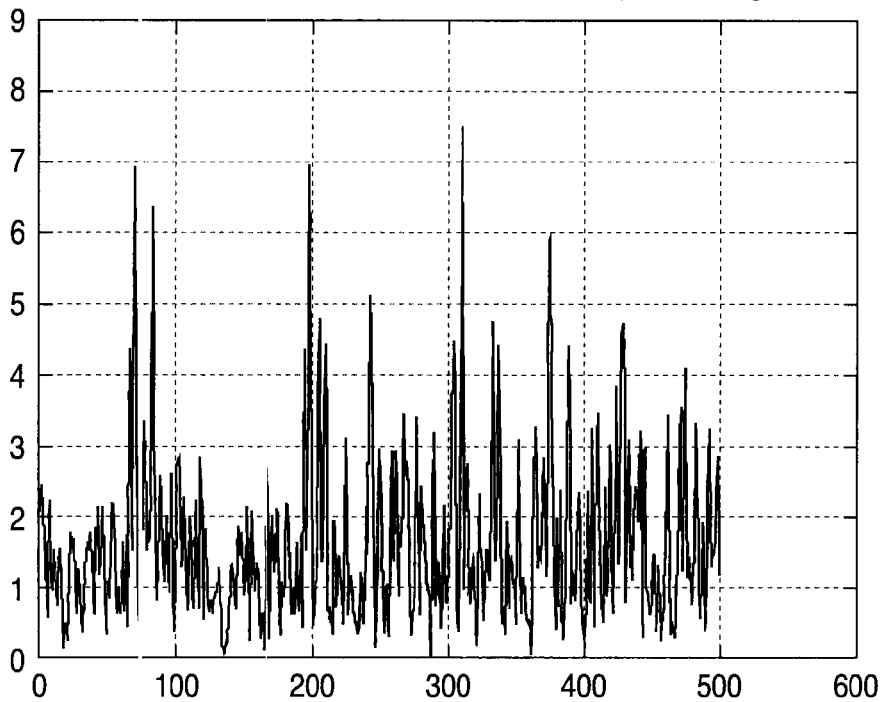

Referring to FIGS. 13A and 13B, for a composite signal of two MIMO signals, FIG. 13A depicts the result when both signals are not compressed, while FIG. 13B depicts the result when one of the two signals is compressed to a level as depicted in 1102 of FIG. 1A. From this it seems that in some cases the compression can be seen, while in other cases the signals continue to exhibit full peaking. As expected, the compressed signal (FIG. 13B) peaks less, but it is not easy to identify the compression without comparing to the reference uncompressed signal (FIG. 13A).

Figure 14A:
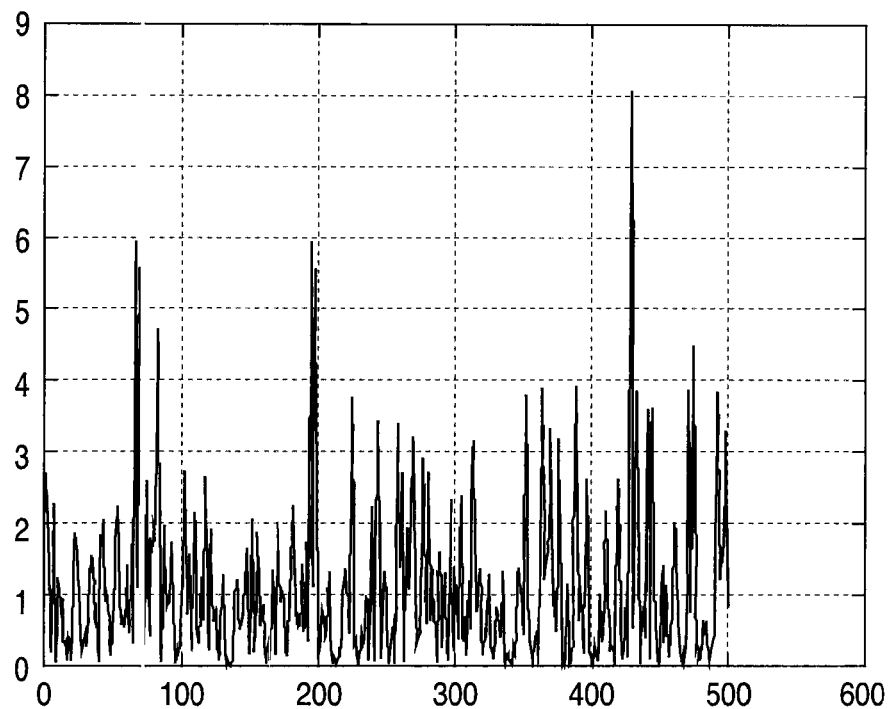
Figure 14B:
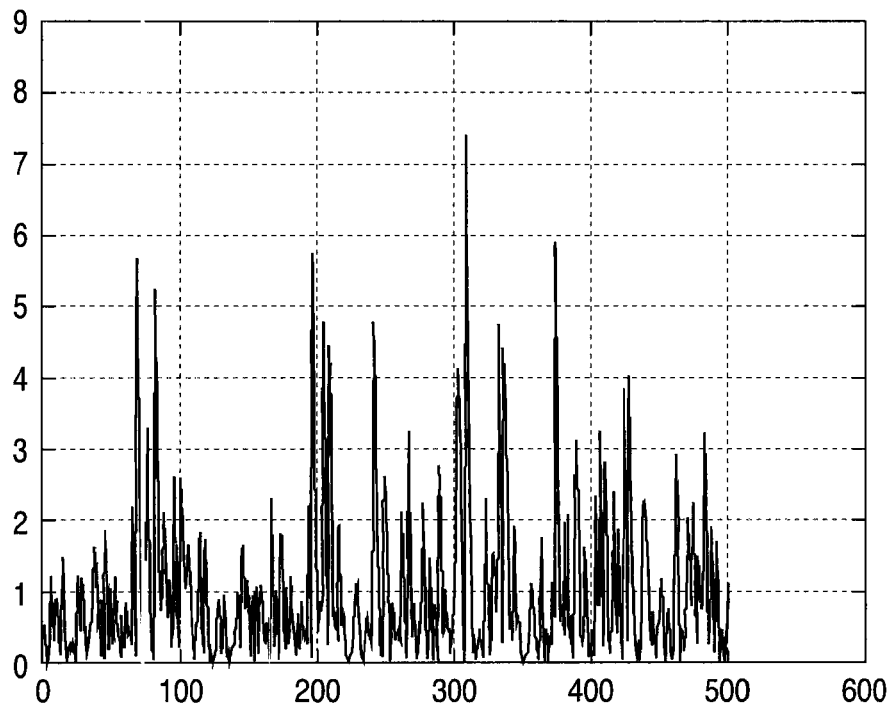
Figure 14C:
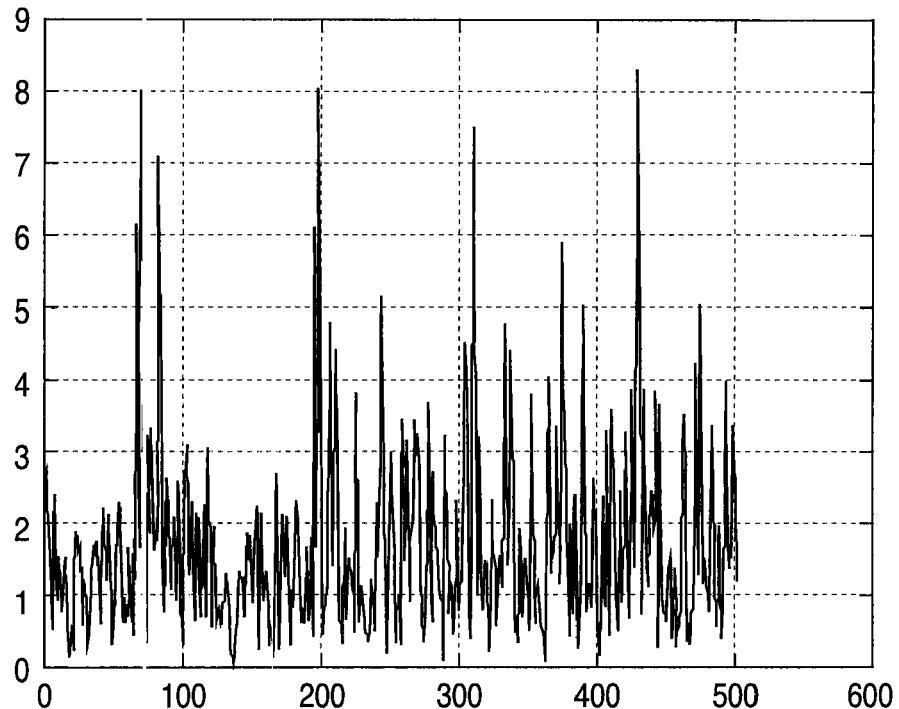

Referring to FIGS. 14A-14C, two individually transmitted signals (FIGS. 14A and 14B) produce the composite signal (FIG. 14C), in which it can be seen that in some instances one signal dominates the peaking, in other instances the other signal dominates, and in still other instances both signals peak simultaneously thereby causing the composite signal to peak even more.

Figure 15A:
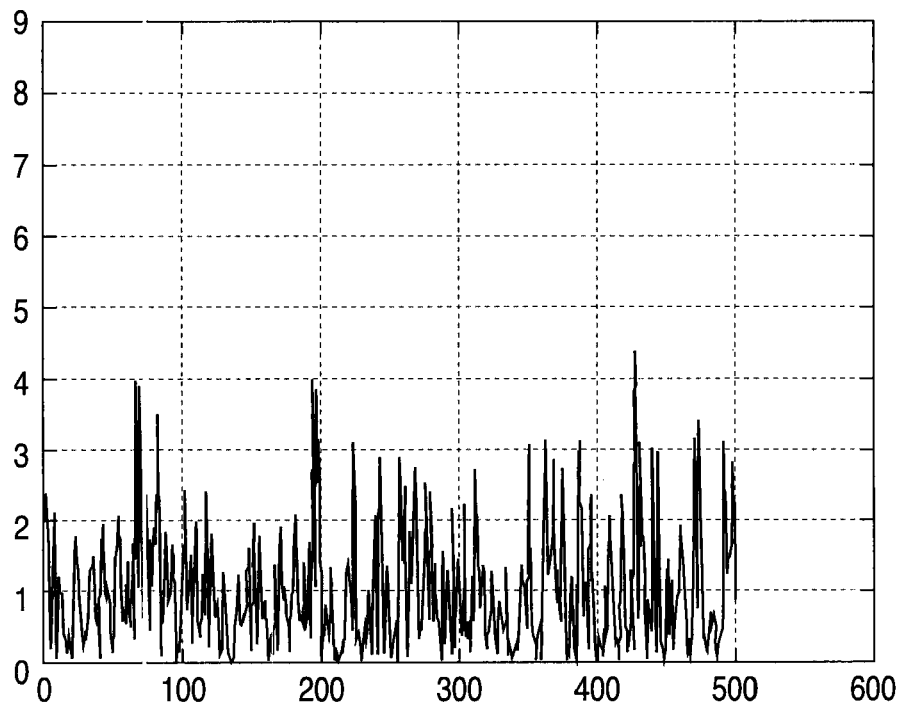
Figure 15B:
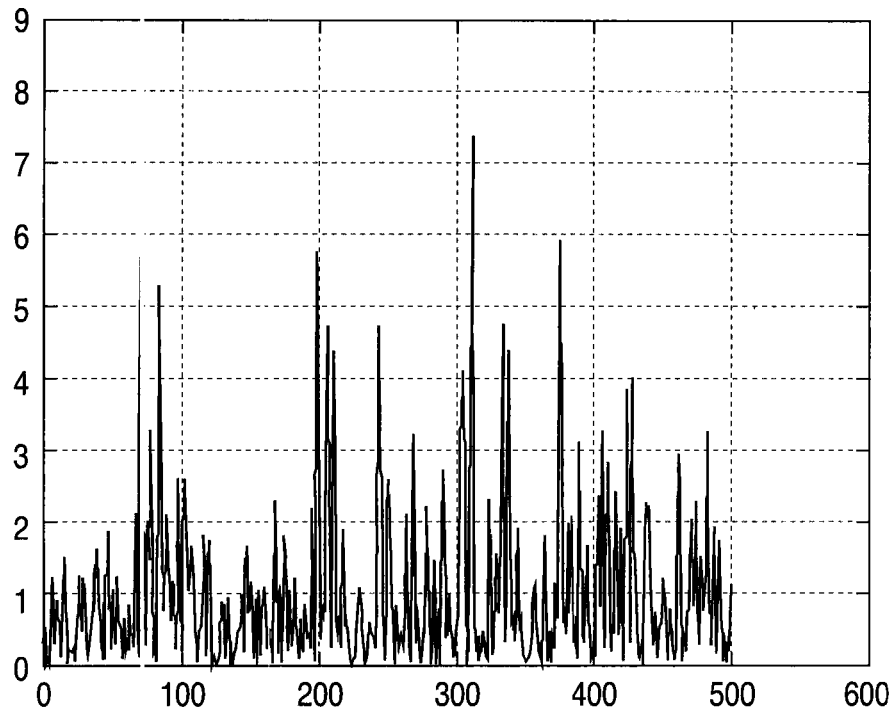
Figure 15C:
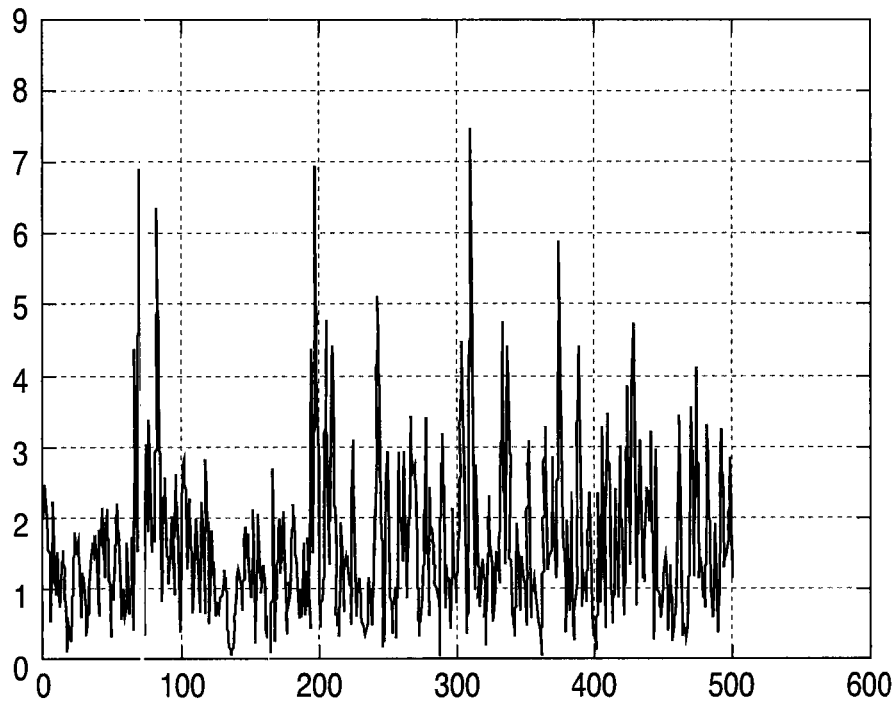
Figure 15D:
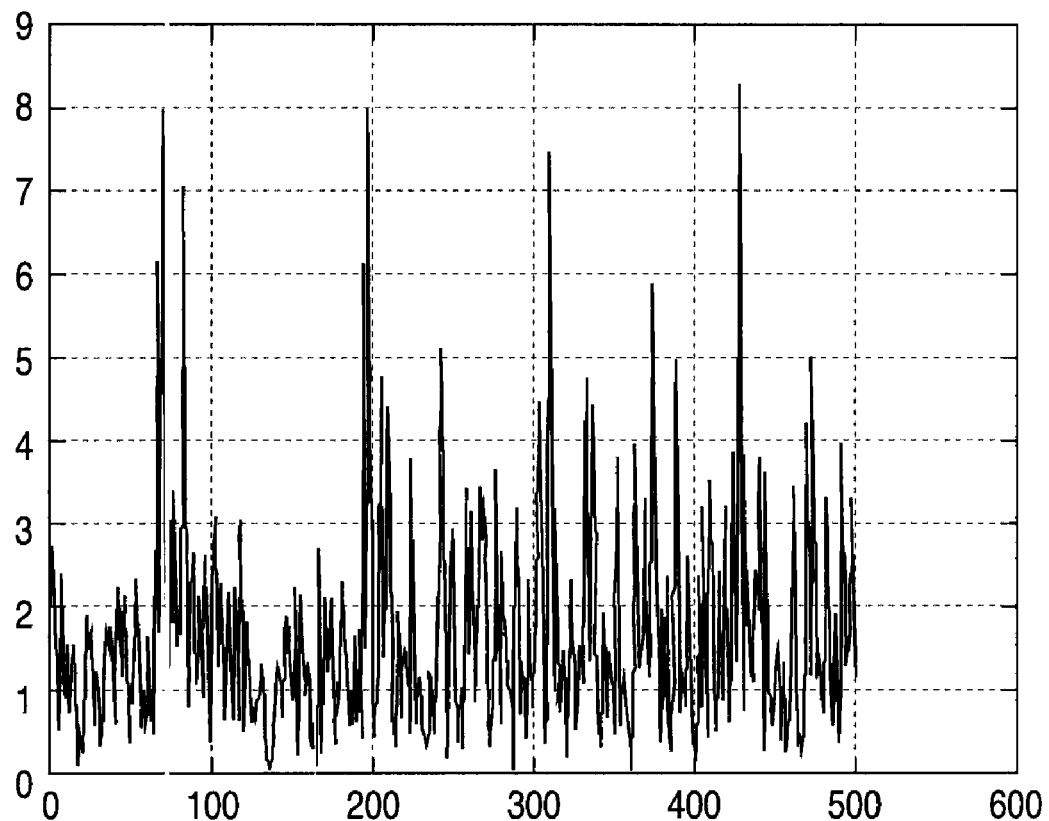

Referring to FIGS. 15A-15D, the same individually transmitted signals (FIGS. 15A and 15B), but with one signal compressed (FIG. 15A) and the other signal not compressed (FIG. 15B), produce another composite signal (FIG. 15C). For comparison, with no signal compressions, yet another composite signal (FIG. 15D) is produced.

As discussed above, if the data sent via the MIMO signal is known, it is possible to estimate the ideal composite signal and from that estimate the EVM. The process extracts the received signal, aligns it in frequency and time to the ideal reference signal, and compares it against the reference signal, with the extracted signal and reference signal being similar to those signals depicted in FIGS. 15C and 15D, respectively. From the individual signal measurements it can be seen that the two individual reference signals exist, so the individual signals also exist. Accordingly, the different peaking points of the two signals can be identified, and how they correlate to the composite (combined) signal. With this knowledge it is possible to analyze the composite signal at the point where one of the signals, as the dominant contributor, dominates the other in power, at which point the ideal composite signal can be compared to the actual measured signal, and compression for the dominant signal can be determined.

Figure 16:
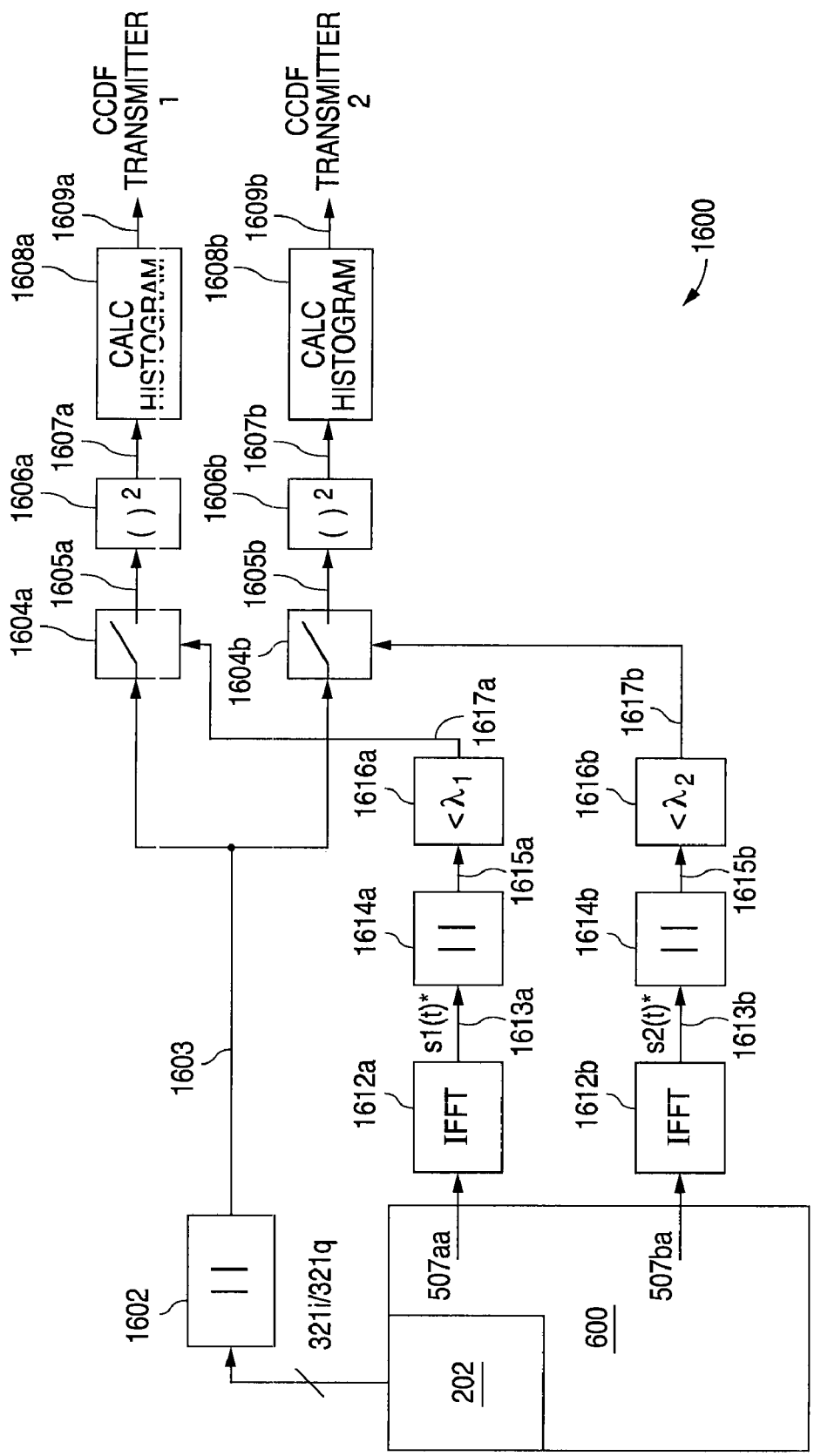
FIG. 16 is block diagram depicting a technique for comparing measured and reference signals in accordance with one aspect of the present invention.
Figure 7:
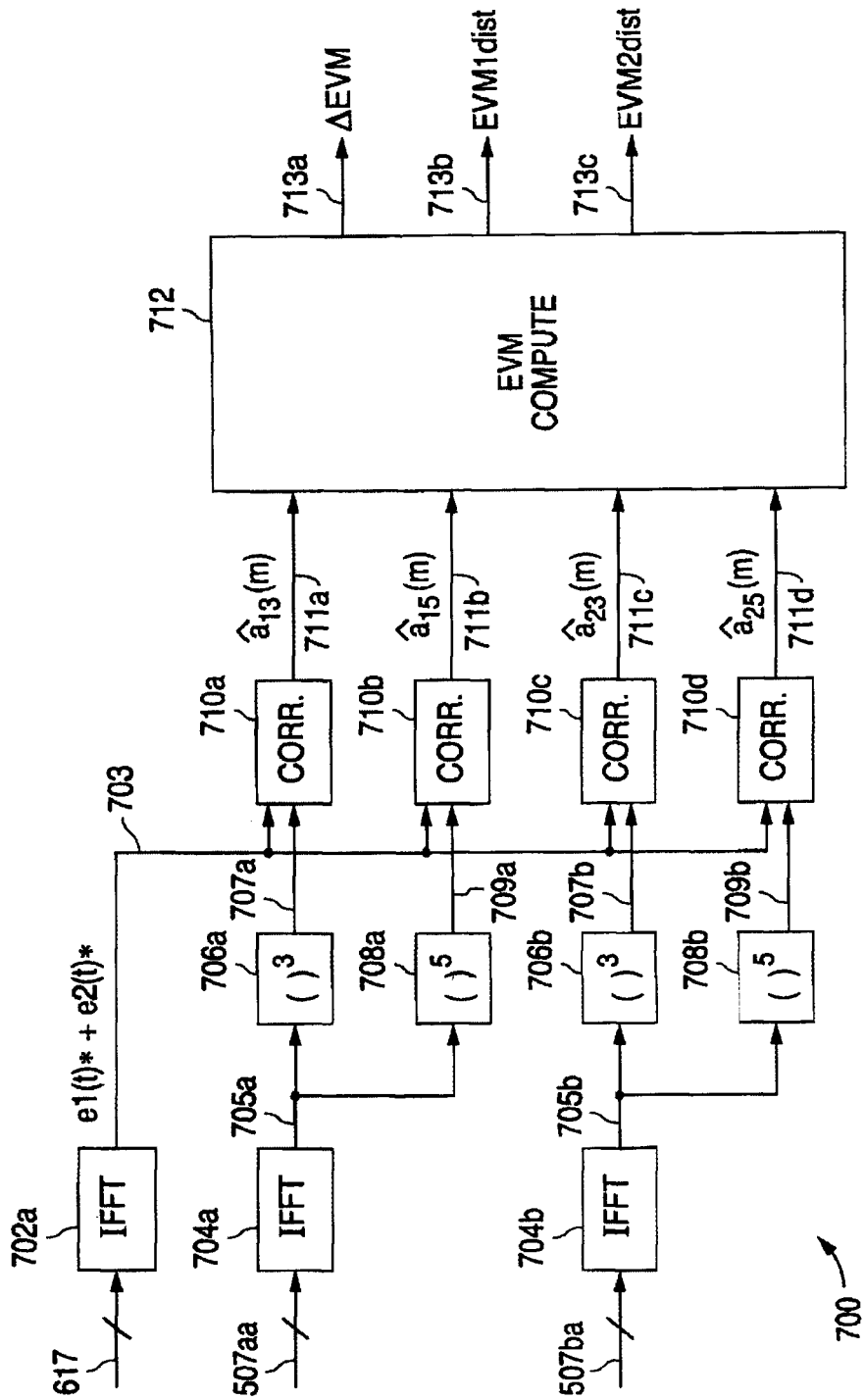

Referring to FIG. 16, one example of circuitry 1600 for acquiring the measured signal and comparing it to the reference signal includes signal envelope detection circuits 1602, 1614a, 1614b, IFFT circuits 1612a, 1612b, threshold comparison circuits 1616a, 1616b, switching circuits 1604a, 1604b, power computation circuits 1606a, 1606b, and histogram computation circuits 1608a, 1608b, substantially as shown. The envelope incoming sampled data vector signal 321i/321q is detected and made available for switching as determined by control signals 1617a, 1617b (discussed below). The power levels of the switched signals 1605a, 1605b are determined, with the resulting signal power data 1607a, 1607b used to compute the CCDF curves for each transmitter.

The locally generated ideal transmitter signals 507aa, 507ba, which are in the frequency domain, are transformed to the time domain through their respective IFFT processes 1612a, 1612b. The envelopes of the transmitter time domain signals 1613a, 1613b are detected and compared against respective thresholds to determine the low power points of the transmitter signals. The resulting control signals 1617a, 1617b are used to switch, or enable, the envelope of the detected composite signal envelope 1603 as discussed above.

Alternative techniques include use of an iterative approach and other variations of actual derivation of the CCDF curves for the respective transmitters, with all being based on the basic approach of comparing the different signals to know the relative powers of the signals, and then compare that result to the measured composite CCDF curve.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a signal analyzer for measuring signal compression levels of one or more individual orthogonal frequency division multiplexed (OFDM) signals among a plurality of OFDM signals within a composite signal, comprising:

first signal detector means for detecting a composite data signal, received via a signal communication path and containing at least first and second OFDM signals, to provide a first detected data signal corresponding to an envelope of said composite data signal, wherein said composite data signal originates from a remote signal source having a plurality of signal transmission processes associated therewith and includes a plurality of data packets each of which includes a respective portion of a plurality of transmit data, and each said respective portion of said plurality of transmit data corresponds to a respective portion of a plurality of known data in relation to a respective one of said plurality of signal transmission processes and said signal communication path;

signal processing means for processing said composite data signal and said plurality of known data in at least partial accordance with a plurality of processes at least substantially similar to said plurality of signal transmission processes to provide at least first and second reference signals corresponding to at least first and second portions of said plurality of known data, respectively;

second signal detector means for detecting said at least first and second reference signals to provide at least first and second control signals, respectively; and signal analyzer means for analyzing, in response to said at least first and second control signals, said first detected data signal to provide at least first and second analysis signals indicative of at least first and second power characteristics of said at least first and second OFDM signals, respectively.

2. The apparatus of claim 1, wherein at least one of said at least first and second power characteristics comprises a complementary cumulative distribution function (CCDF).

3. The apparatus of claim 1, wherein each of said plurality of data packets further includes a respective portion of a plurality of preamble data, and said signal processing means comprises:

preamble processing means for processing at least said respective portion of said plurality of preamble data to provide at least a plurality of control data; and data processing means for receiving said plurality of known data and said plurality of control data and in response thereto processing said plurality of known data in accordance with said plurality of processes to provide said at least first and second reference signals.

4. The apparatus of claim 1, wherein said second signal detector means comprises:

signal envelope detector means for detecting said at least first and second reference signals to provide at least second and third detected data signals corresponding to respective envelopes of said first and second reference signals, respectively; and signal threshold detector means for detecting said at least second and third detected data signals to provide said at least first and second control signals, respectively.

5. The apparatus of claim 1, wherein said signal analyzer means comprises:

switcher means for selecting, responsive to said at least first and second control signals, at least partially temporally distinct portions of said first detected data signal to provide at least first and second selected signals;

power detector means for detecting respective power levels for said at least first and second selected signals to provide at least first and second power signals, respectively; and processor means for processing said at least first and second power signals to provide said at least first and second analysis signals, respectively.

6. A method for measuring signal compression levels of one or more individual orthogonal frequency division multiplexed (OFDM) signals among a plurality of OFDM signals within a composite signal, comprising:

detecting a composite data signal, received via a signal communication path and containing at least first and second OFDM signals, to provide a first detected data signal corresponding to an envelope of said composite data signal, wherein said composite data signal originates from a remote signal source having a plurality of signal transmission processes associated therewith and includes a plurality of data packets each of which includes a respective portion of a plurality of transmit data, and each said respective portion of said plurality of transmit data corresponds to a respective portion of a plurality of known data in relation to a respective one of said plurality of signal transmission processes and said signal communication path;

processing said composite data signal and said plurality of known data in at least partial accordance with a plurality of processes at least substantially similar to said plurality of signal transmission processes to provide at least first and second reference signals corresponding to at least first and second portions of said plurality of known data, respectively;

detecting said at least first and second reference signals to provide at least first and second control signals, respectively; and analyzing, in response to said at least first and second control signals, said first detected data signal to provide at least first and second analysis signals indicative of at least first and second power characteristics of said at least first and second OFDM signals, respectively.

7. The method of claim 6, wherein at least one of said at least first and second power characteristics comprises a complementary cumulative distribution function (CCDF).

8. The method of claim 6, wherein each of said plurality of data packets further includes a respective portion of a plurality of preamble data, and said processing comprises:

processing at least said respective portion of said plurality of preamble data to provide at least a plurality of control data; and receiving said plurality of known data and said plurality of control data and in response thereto processing said plurality of known data in accordance with said plurality of processes to provide said at least first and second reference signals.

9. The method of claim 6, wherein said detecting said at least first and second reference signals comprises:

detecting said at least first and second reference signals to provide at least second and third detected data signals corresponding to respective envelopes of said first and second reference signals, respectively; and detecting said at least second and third detected data signals to provide said at least first and second control signals, respectively.

10. The method of claim 6, wherein said analyzing comprises:

selecting, responsive to said at least first and second control signals, at least partially temporally distinct portions of said first detected data signal to provide at least first and second selected signals;

detecting respective power levels for said at least first and second selected signals to provide at least first and second power signals, respectively; and processing said at least first and second power signals to provide said at least first and second analysis signals, respectively.

* * * * *

UNITED STATES PATENT AND TRADEMARK OFFICE
CERTIFICATE OF CORRECTION

PATENT NO. : 7,706,250 B2  
APPLICATION NO. : 11/533987  
DATED : April 27, 2010  
INVENTOR(S) : Christian Olgaard et al.

It is certified that error appears in the above-identified patent and that said Letters Patent is hereby corrected as shown below:

In the Drawings

The drawing sheet(s) 8 of 19 consisting of fig(s) 7 should be deleted and substitute therefore the attached drawing sheet(s) 8 of 19 consisting of fig(s) 7.

Signed and Sealed this
Nineteenth Day of February, 2013

Teresa Stanek Rea
*Acting Director of the United States Patent and Trademark Office*

(12) EX PARTE REEXAMINATION CERTIFICATE (8199th)
United States Patent
Olgaard et al.

(10) Number: US 7,706,250 C1
(45) Certificate Issued: May 3, 2011

(54) APPARATUS AND METHOD FOR SIMULTANEOUS TESTING OF MULTIPLE ORTHOGONAL FREQUENCY DIVISION MULTIPLEXED TRANSMITTERS WITH SINGLE VECTOR SIGNAL ANALYZER

(75) Inventors: Christian Volf Olgaard, Sunnyvale, CA (US); Stephen James Bennett, San Francisco, CA (US); Vakis Papaparaskeva, Sunnyvale, CA (US); Dirk Walvis, Santa Cruz, CA (US)

(73) Assignee: Litepoint Corp., Sunnyvale, CA (US)

Reexamination Request:
No. 90/011,268, Oct. 6, 2010

Reexamination Certificate for:
Patent No.: 7,706,250
Issued: Apr. 27, 2010
Appl. No.: 11/533,987
Filed: Sep. 21, 2006

Related U.S. Application Data

(60) Provisional application No. 60/596,444, filed on Sep. 23, 2005.

(51) Int. Cl.
*H04J 11/00* (2006.01)

(52) U.S. Cl. .................................. 370/208; 375/260
(58) Field of Classification Search ..................... None
See application file for complete search history.

(56) References Cited

PUBLICATIONS

Anthony P. Webster, "Modeling and Measurement Techniques for 5 GHz OFDM Wireless LAN Transceivers," Master's Thesis, University of South Florida, Approved Mar. 31, 2004, available to the public, Jun. 21, 2004.

Jianhua Liu et al., "A MIMO System with Backward Compatibility for OFDM–Based WLANs," EURASIP Journal on Applied Signal Processing, vol. 2004, No. 5, pp. 696–706, May 2004.

Webster, Anthony P., et al., "Measurement–based Modeling of a 5 GHz WLAN Transmitter", Google Scholar on line, http://ee.eng.usf.edu, Sep. 19, 1994, 4 pages.

Olgaard, Christian, "Combining CCDF and EVM Assess 802.11 Transmitters", Google Scholar, www.litepoint.com, Sep. 1, 2004, 1 page.

Olgaard, Christian, "Using Advanced Signal Analysis to Identify Sources of WLAN ransmitter Degradations", RFDESIGN, http://rfdesign.com/mag/410rfdf2a, Oct. 1, 2004, 5 pages.

*Primary Examiner* — John M Hotaling, II

(57) ABSTRACT

A signal analyzer and method for measuring signal compression levels of one or more individual orthogonal frequency division multiplexed (OFDM) signals among a plurality of OFDM signals within a composite signal.

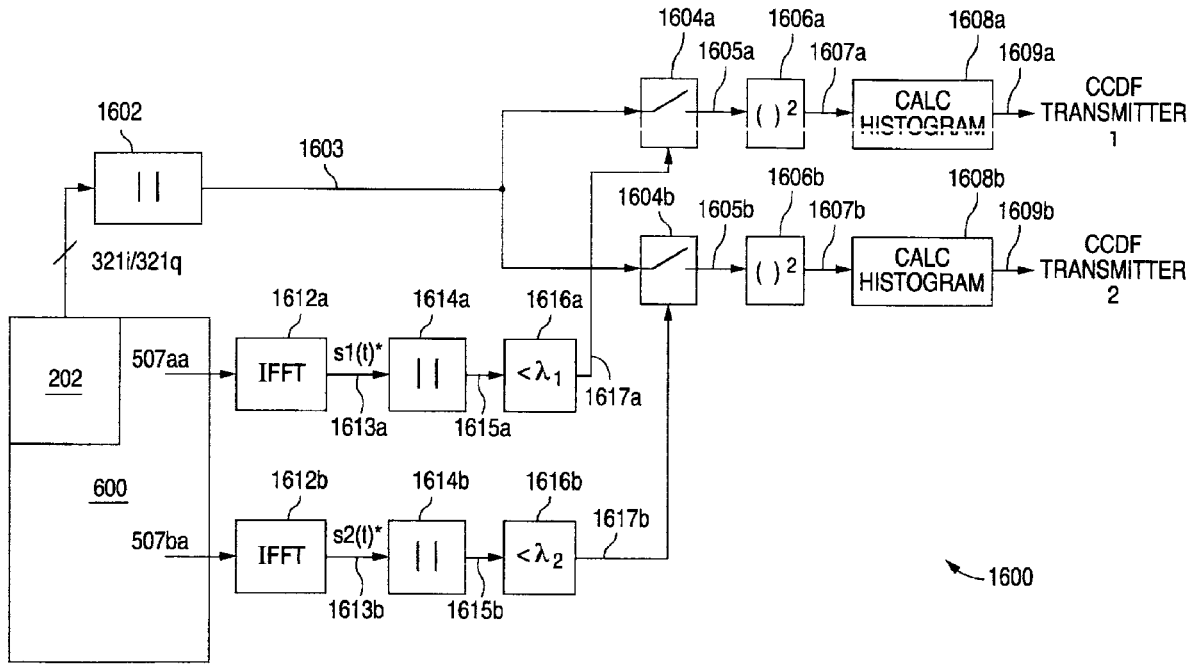

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *